United States Patent
Ichimura

(10) Patent No.: US 11,323,769 B2
(45) Date of Patent: *May 3, 2022

(54) TRANSMISSION APPARATUS, TRANSMISSION METHOD, RECEIVING APPARATUS, AND RECEIVING METHOD FOR PROCESSING AUDIO DATA IN SYNCHRONIZATION BETWEEN A TRANSMISSION SIDE AND A RECEPTION SIDE

(71) Applicant: SONY CORPORATION, Tokyo (JP)

(72) Inventor: Gen Ichimura, Tokyo (JP)

(73) Assignee: SONY CORPORATION, Tokyo (JM)

( * ) Notice: Subject to any disclaimer, the term of this patent is extended or adjusted under 35 U.S.C. 154(b) by 442 days.

This patent is subject to a terminal disclaimer.

(21) Appl. No.: 16/328,504

(22) PCT Filed: Sep. 14, 2017

(86) PCT No.: PCT/JP2017/033353
§ 371 (c)(1),
(2) Date: Feb. 26, 2019

(87) PCT Pub. No.: WO2018/061810
PCT Pub. Date: Apr. 5, 2018

(65) Prior Publication Data
US 2021/0281908 A1    Sep. 9, 2021

(30) Foreign Application Priority Data
Sep. 30, 2016    (JP) .............................. JP2016-192804

(51) Int. Cl.
H04N 7/16         (2011.01)
H04N 21/439      (2011.01)
(Continued)

(52) U.S. Cl.
CPC ......... *H04N 21/439* (2013.01); *H04N 21/435* (2013.01); *H04N 21/436* (2013.01)

(58) Field of Classification Search
CPC ... H04N 21/435; H04N 21/436; H04N 21/439
See application file for complete search history.

(56) References Cited

U.S. PATENT DOCUMENTS 5,206,851 A * 4/1993 Cho .................... G11B 20/1809
                                                            369/47.2
6,456,966 B1 * 9/2002 Iwabuchi ......... G11B 20/10527
                                                            704/201

(Continued)

FOREIGN PATENT DOCUMENTS

JP    08-23336 A      1/1996
JP    08-023336 A     1/1996
(Continued)

OTHER PUBLICATIONS

International Search Report and Written Opinion of PCT Application No. PCT/JP2017/033353, dated Oct. 31, 2017, 08 pages of ISRWO.

(Continued)

*Primary Examiner* — Gigi L Dubasky
(74) *Attorney, Agent, or Firm* — Chip Law Group

(57) ABSTRACT

To allow special processing while processing is synchronized between a transmission side and a reception side.
Each audio data unit of audio data is sequentially transmitted to a reception side via a predetermined transfer channel. A counter value and a parity value associated with the counter value are, for every predetermined number of audio data units, added to the audio data. Predetermined information is transmitted to the reception side with the counter value and the parity value being in a predetermined state based on a preset rule.

16 Claims, 18 Drawing Sheets

| P7 | B6–B0 | STATE |
|----|-------|-------|
| 0  | 0     | RESET STATE |
| 0  | 0     | NO ENCRYPTION |
| 0  | 0     |       |
| 1  | 1     | ENCRYPTION |
| 1  | 2     | ENCRYPTION |
| 0  | 3     | ENCRYPTION |
| 1  | 4     | ENCRYPTION |
| 0  | 5     | ENCRYPTION |
| 1  | 5     | PAUSE |
| 1  | 5     | PAUSE |
| 1  | 5     | PAUSE |
| 0  | 6     | RESUME ENCRYPTION |
| 1  | 7     | ENCRYPTION |

(51) Int. Cl.
*H04N 21/435* (2011.01)
*H04N 21/436* (2011.01)

(56) References Cited

U.S. PATENT DOCUMENTS

| | | | | |
|---|---|---|---|---|
| 6,788,881 B1* | 9/2004 | Kuroiwa | ............... | G11B 27/036 386/239 |
| 7,088,398 B1* | 8/2006 | Wolf | ................. | H04N 21/2383 348/423.1 |
| 2001/0033629 A1* | 10/2001 | Ito | ........................ | G11B 20/10 375/368 |
| 2003/0179861 A1* | 9/2003 | Miyoshi | ................. | G11B 20/10 379/68 |
| 2011/0261869 A1* | 10/2011 | Suwa | .................... | G10L 19/005 375/224 |
| 2015/0200748 A1* | 7/2015 | Shibuta | ................. | H03M 13/09 375/254 |

FOREIGN PATENT DOCUMENTS

| | | |
|---|---|---|
| JP | 11-32076 A | 2/1999 |
| JP | 11-032076 A | 2/1999 |
| JP | 2001-251284 A | 9/2001 |

OTHER PUBLICATIONS

Office Action for JP Patent Application No. 2018-542386, dated Jul. 20, 2021, 06 pages of Office Action and 05 pages of English Translation.

* cited by examiner

FIG. 7

HDMI PIN ASSIGNMENT (Type-A CASE)

| PIN | Signal Assignment | PIN | Signal Assignment |
|---|---|---|---|
| 1 | TMDS Data2+ | 2 | TMDS Data2 Shield |
| 3 | TMDS Data2− | 4 | TMDS Data1+ |
| 5 | TMDS Data1 Shield | 6 | TMDS Data1− |
| 7 | TMDS Data0+ | 8 | TMDS Data0 Shield |
| 9 | TMDS Data0− | 10 | TMDS Clock+ |
| 11 | TMDS Clock Shield | 12 | TMDS Clock− |
| 13 | CEC | 14 | Reserved (N.C. on device) |
| 15 | SCL | 16 | SDA |
| 17 | DDC/CEC Ground | 18 | +5V Power |
| 19 | Hot Plug Detect | | |

FIG. 13

| PREAMBLE | CHANNEL CODING | | |
|---|---|---|---|
| "B" | 11101000 | 00010111 | SUBFRAME #1, START BLOCK |
| "M" | 11100010 | 00011101 | SUBFRAME #1 |
| "W" | 11100100 | 00011011 | SUBFRAME #2 |
| | 0 | 1 | |
| | (MOST-RECENT STATE) | | |

FIG. 14

| | 0 | 1 | 2 | 3 | 4 | 5 | 6 | 7 |
|---|---|---|---|---|---|---|---|---|
| bit 0 | a = "0" | b = "0" | c | d | Mode = "00" | | | |
| bit 1 | 0 | 1 | 2 | 3 | 4 | 5 | 6 | 7 |
| bit 2 | 8 | 9 | 10 | 11 | 12 | 13 | 14 | 15 |
| | | Source number | | Category code | | Channel number | | |
| bit 3 | 16 | 17 | 18 | 19 | 20 | 21 | 22 | 23 |
| | Sampling frequency | | | | Clock accuracy | | Sampling frequency extension | |
| bit 4 | 24 | 25 | 26 | 27 | 28 | 29 | 30 | 31 |
| | Word length | | | | Original sampling frequency | | | |
| bit 5 | 32 | 33 | 34 | 35 | 36 | 37 | 38 | 39 |
| | CCMS-A | | CCMS-A validity | Audio sampling frequency coefficient | | | | |
| bit 6 | 40 | 41 | 42 | 43 | 44 | 45 | 46 | 47 |
| | Information Hidden in PCM signal | | | General channel assignment channel number for A channel | | | | General channel assignment channel number for B channel |
| bit 7 | 48 | 49 | 50 | 51 | 52 | 53 | 54 | 55 |
| | General channel assignment channel number for B channel | | | | | | | |
| bit 8 | 56 | 57 | 58 | 59 | 60 | 61 | 62 | 63 |
| | 57 | 58 | 59 | 60 | 61 | 62 | 63 | |
| | P7 | 56 | 65 | 67 | 63 | 82 | 81 | 80 |
| | 64 | 65 | 66 | 67 | 68 | 69 | 70 | 71 |
| ⋯ | ⋯ | ⋯ | ⋯ | ⋯ | ⋯ | ⋯ | ⋯ | ⋯ |
| bit 23 | 184 | 185 | 186 | 187 | 188 | 189 | 190 | 191 |

| P7 | B6~B0 | STATE |
|---|---|---|
| 0 | 0 | RESET STATE |
| 0 | 0 | NO ENCRYPTION |
| 0 | 0 | |
| 1 | 1 | ENCRYPTION |
| 1 | 2 | ENCRYPTION |
| 0 | 3 | ENCRYPTION |
| 1 | 4 | ENCRYPTION |
| 0 | 5 | ENCRYPTION |
| 1 | 5 | PAUSE |
| 1 | 5 | PAUSE |
| 1 | 5 | PAUSE |
| 0 | 6 | RESUME ENCRYPTION |
| 1 | 7 | ENCRYPTION |

| P7 | B6-B0 | ORIGINAL COUNTER VALUE | STATE |
|---|---|---|---|
| 0 | 0 | 0 | RESET STATE |
| 0 | 0 | 0 | NO ENCRYPTION |
| 0 | 0 | 0 | |
| 1 | 31 | 1 | ENCRYPTION |
| 0 | 3 | 2 | ENCRYPTION |
| 0 | 77 | 3 | ENCRYPTION |
| 1 | 4 | 4 | ENCRYPTION |
| 0 | 101 | 5 | ENCRYPTION |
| 1 | 101 | 5 | PAUSE |
| 1 | 101 | 5 | PAUSE |
| 1 | 101 | 5 | PAUSE |
| 0 | 9 | 6 | RESUME ENCRYPTION |
| 0 | 46 | 7 | ENCRYPTION |

TRANSMISSION APPARATUS, TRANSMISSION METHOD, RECEIVING APPARATUS, AND RECEIVING METHOD FOR PROCESSING AUDIO DATA IN SYNCHRONIZATION BETWEEN A TRANSMISSION SIDE AND A RECEPTION SIDE

CROSS REFERENCE TO RELATED APPLICATIONS

This application is a U.S. National Phase of International Patent Application No. PCT/JP2017/033353 filed on Sep. 14, 2017, which claims priority benefit of Japanese Patent Application No. JP 2016-192804 filed in the Japan Patent Office on Sep. 30, 2016. Each of the above-referenced applications is hereby incorporated herein by reference in its entirety.

TECHNICAL FIELD

The present invention relates to a transmission apparatus, a transmission method, a receiving apparatus, and a receiving method, and specifically relates to, e.g., a transmission apparatus configured to transmit audio data.

BACKGROUND ART

Typically, IEC 60958 standards have been broadly used for digital audio transfer. For example, Patent Document 1 describes the IEC 60958 standards. Moreover, standards such as a high-definition multimedia interface (HDMI) and a display port (Displayport) have been used for digital audio video transfer. According to these standards, a stream according to the IEC 60958 standards is packetized for transferring a digital audio portion.

For copyright protection, a high-bandwidth digital content protection system (HDCP) is applicable to the HDMI and the display port. In transferring, audio video is together encrypted, and in this manner, unauthorized copying on a transfer channel can be prevented. For this reason, the IEC 60958 standards themselves do not have a mechanism for encryption for copyright protection. However, due to recent enhancement of the sound quality of an audio signal itself and recent multi-channelizing, the mechanism for encryption for copyright protection has been also demanded in transferring of only audio.

In the case of encrypting digital data, a key used for such encryption is not constant in transferring, and normally changes over time. If the timing of such a change is not synchronized between a transmission side and a reception side, data decoding cannot be accurately performed on the reception side. In response, counters may be provided in devices on both of the transmission side and the reception side, and from the start of transmission, a counter value may be changed according to each block, a digital audio data amount, or the like to change the key. However, this cannot respond to, e.g., a data loss due to an error on the transfer channel or pausing and resuming in the middle of encryption processing.

CITATION LIST

Patent Document

Patent Document 1: Japanese Patent Application Laid-Open No. 2009-130606

SUMMARY OF THE INVENTION

Problems to be Solved by the Invention

An object of the present technology is to allow special processing while processing is synchronized between a transmission side and a reception side.

Solutions to Problems

The concept of the present technology is a transmission apparatus including a data transmitter configured to sequentially transmit each audio data unit of audio data to a reception side via a predetermined transfer channel, and an information adder configured to add, for every predetermined number of audio data units, a counter value and a parity value associated with the counter value to the audio data transmitted by the data transmitter.

Predetermined information is transmitted to the reception side with the counter value and the parity value being in a predetermined state based on a preset rule.

In the present technology, each audio data unit of the audio data is sequentially transmitted to the reception side via the predetermined transfer channel by the data transmitter. By the information adder, the counter value and the parity value associated with the counter value are, for every predetermined number of audio data units, added to the audio data. The predetermined information is transmitted to the reception side with the counter value and the parity value being in the predetermined state based on the preset rule.

For example, the predetermined information may be information indicating that audio of the audio data needs to be muted. Alternatively, an encrypter configured to encrypt the audio data transmitted by the data transmitter may be, for example, further provided, and the predetermined information may be information indicating the state of encryption of the audio data.

In this case, while a reset state in which no encryption is performed for the audio data is continued, the counter value may be maintained at "0," the parity value may be a preset parity value of an even-number parity or an odd-number parity, for example. Alternatively, in this case, while a pause state in which no encryption is performed for the audio data is continued, the counter value may be fixed to a predetermined value, and the parity value may be an inverted value of the preset parity value of the even-number parity or the odd-number parity, for example.

Alternatively, in this case, while a state in which encryption is performed for the audio data is continued, the counter value may be incremented for every predetermined number of audio data units, and the parity value may be the preset parity value of the even-number parity or the odd-number parity, for example. Alternatively, in this case, while the state in which encryption is performed for the audio data is continued, the counter value may be incremented for every predetermined number of audio data units and may be further encrypted, and the parity value may be the preset parity value of the even-number parity or the odd-number parity, for example.

For example, the information adder may use a predetermined bit region of a channel status of each block formed for every predetermined number of audio data units to add the counter value and the parity value. Moreover, in this case, the predetermined bit region may be, for example, a 8-bit region, the 8-bit region including a region where a 7-bit counter value is arranged and a region where a 1-bit parity value added to a leading side of the region is arranged.

As described above, the present technology is to add, for every predetermined number of audio data units, the counter value and the parity value associated with the counter value to the audio data and to transmit the predetermined information to the reception side with the counter value and the parity value being in the predetermined state based on the preset rule. Thus, on the reception side, special processing (muting processing, code decoding processing, and the like) can be performed in synchronization with processing on a transmission side on the basis of the counter value and the parity value and therefore the predetermined information.

Moreover, other concepts of the present technology are a receiving apparatus including a data receiver configured to sequentially receive each audio data unit of audio data from a transmission side via a predetermined transfer channel.

A counter value and a parity value associated with the counter value are, for every predetermined number of audio data units, added to the audio data.

The counter value and the parity value are in a predetermined state based on a preset rule, and indicate predetermined information.

A controller configured to control processing on the basis of the counter value and the parity value is further provided.

In the present technology, each audio data unit of the audio data is, by the data receiver, sequentially received from the transmission side via the predetermined transfer channel. The counter value and the parity value associated with the counter value are, for every predetermined number of audio data units, added to the audio data. The counter value and the parity value are in the predetermined state based on the preset rule, and indicate the predetermined information. By the controller, the processing such as processing for the audio data is controlled on the basis of the counter value and the parity value.

For example, the predetermined information may be information indicating that audio of the audio data needs to be muted, and the controller may control the processing of muting the audio of the audio data. Alternatively, the predetermined information may be information indicating the state of encryption of the audio data, and the controller may control decoding processing for the audio data, for example.

Alternatively, a predetermined bit region of a channel status of each block formed for every predetermined number of audio data units may be used to add the counter value and the parity value to the audio data, for example. In this case, for example, the predetermined bit region may be a 8-bit region, the 8-bit region including a region where a 7-bit counter value is arranged and a region where a 1-bit parity value added to a leading side of the region is arranged.

As described above, the present technology is to control the processing on the basis of the counter value and the parity value (provided in the predetermined state based on the preset rule and indicating the predetermined information) added to every predetermined number of audio data units of the audio data. Thus, the special processing (e.g., the muting processing and the code decoding processing) can be performed in synchronization with the processing on the transmission side.

Effects of the Invention

According to the present technology, the special processing is allowed while the processing is synchronized between the transmission side and the reception side. Note that advantageous effects described in the present specification have been set forth merely as examples, and are not limited. Moreover, additional advantageous effects may be provided.

BRIEF OF DRAWINGS

FIG. 7 is a table of pin assignment of an HDMI connector.

FIG. 13 is a table of channel coding of a preamble according to the IEC 60958 standards.

FIG. 14 is a diagram of a channel status format according to the IEC 60958 standards.

MODE FOR CARRYING OUT THE INVENTION

Hereinafter, a mode (hereinafter referred to as an "embodiment") for carrying out the invention will be described. Note that description will be made in the following order.

1. Embodiment
2. Variations

1. Embodiment

[Configuration Example of AV System]

Figure 1:
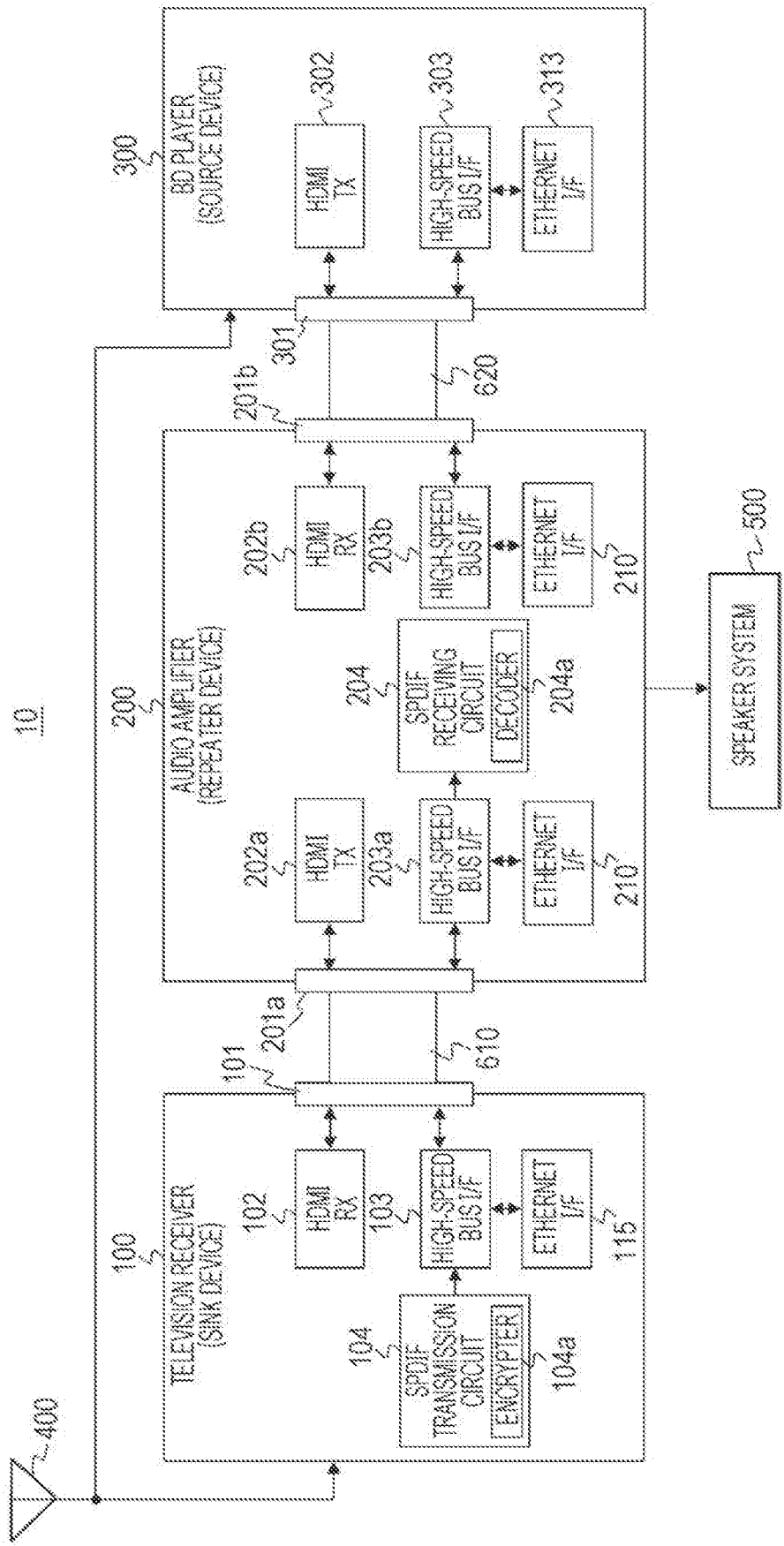
FIG. 1 is a block diagram of a configuration example of an AV system as an embodiment.

FIG. 1 illustrates a configuration example of an AV system 10 as the embodiment. The AV system 10 has a television receiver 100 as a sink device, an audio amplifier 200 as a repeater device, and a Blu-Ray disc (BD) player 300 as a source device. A telecasting receiving antenna 400 is connected to the television receiver 100 and the BD player 300. Moreover, a 2-channel or multichannel speaker system 500 is connected to the audio amplifier 200.

The television receiver 100 and the audio amplifier 200 are connected to each other via an HDMI cable 610. The television receiver 100 includes an HDMI terminal 101 connected to an HDMI receiver (HDMI RX) 102 and a high-speed bus interface 103 forming a communicator. An Ethernet interface 115 and a Sony Philips digital interface (SPDIF) transmission circuit 104 are connected to the high-speed bus interface 103. The SPDIF transmission circuit 104 has an encrypter 104a.

Moreover, the audio amplifier 200 includes an HDMI terminal 201a connected to an HDMI transmitter (HDMI TX) 202a and a high-speed bus interface 203a forming the communicator. An Ethernet interface 210 and a SPDIF receiving circuit 204 are connected to the high-speed bus interface 203a. The SPDIF receiving circuit 204 has a decoder 204a. One end of the above-described HDMI cable 610 is connected to the HDMI terminal 101 of the television receiver 100, and the other end of the HDMI cable 610 is connected to the HDMI terminal 201a of the audio amplifier 200.

Further, the audio amplifier 200 and the BD player 300 are connected to each other via an HDMI cable 620. The audio amplifier 200 includes an HDMI terminal 201b connected to an HDMI receiver (HDMI RX) 202b and a high-speed bus interface 203b forming the communicator.

In addition, the BD player 300 includes an HDMI terminal 301 connected to an HDMI transmitter (HDNI TX) 302 and a high-speed bus interface 303 forming the communicator. One end of the above-described HDMI cable 620 is connected to the HDMI terminal 201b of the audio amplifier 200, and the other end of the HDMI cable 620 is connected to the HDMI terminal 301 of the BD player 300.

[Configuration Example of Television Receiver]

Figure 2:
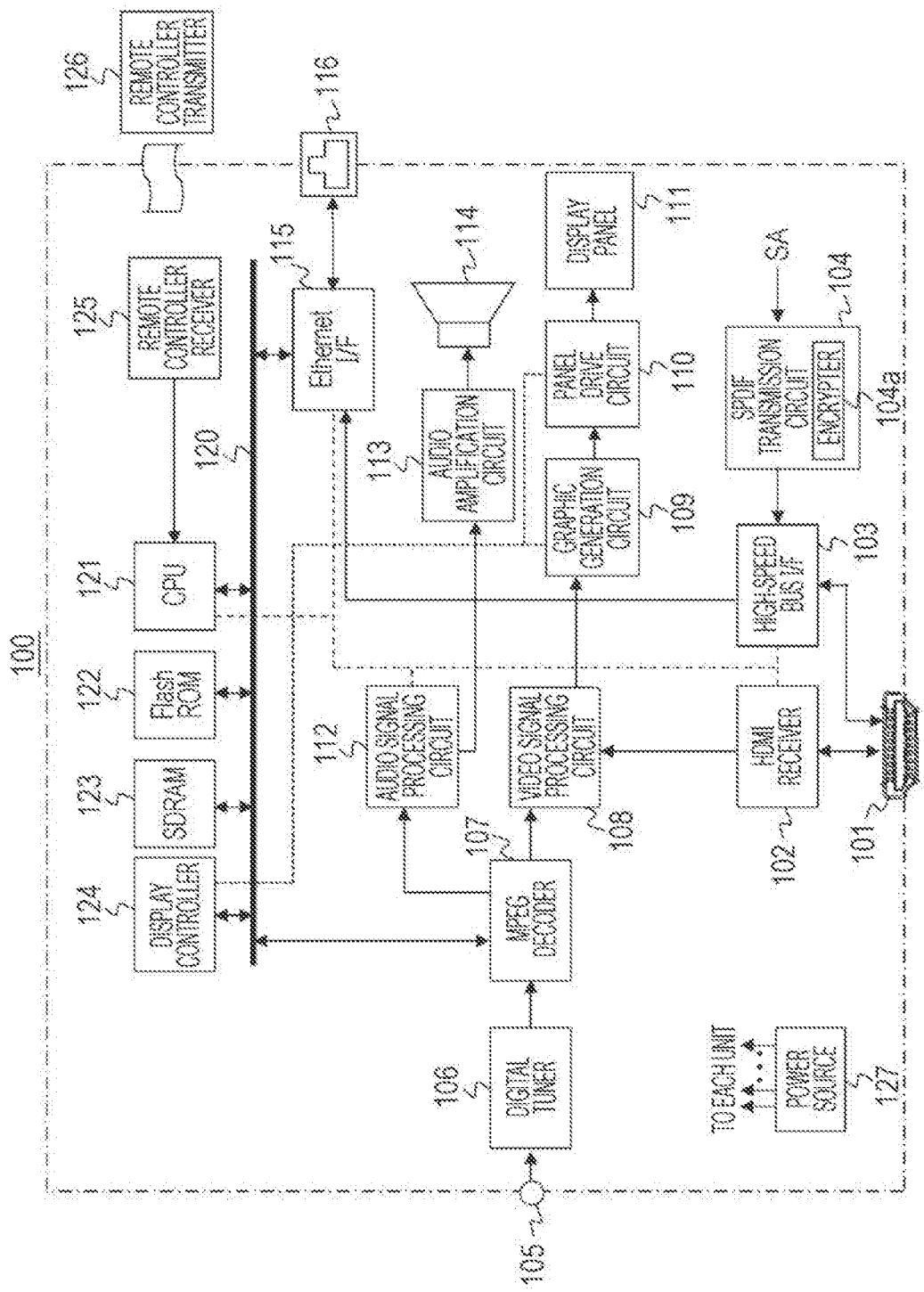
FIG. 2 is a block diagram of a configuration example of a television receiver forming the AV system.

FIG. 2 illustrates a configuration example of the television receiver 100. The television receiver 100 has the HDMI terminal 101, the HDMI receiver 102, the high-speed bus interface 103, and the Sony Philips digital interface (SPDIF) transmission circuit 104. Moreover, the television receiver 100 has an antenna terminal 105, a digital tuner 106, an MPEG decoder 107, a video signal processing circuit 108, a graphic generation circuit 109, a panel drive circuit 110, and a display panel 111.

Further, the television receiver 100 has an audio signal processing circuit 112, an audio amplification circuit 113, a speaker 114, the Ethernet interface (Ethernet I/F) 115, and a network terminal 116. In addition, the television receiver 100 has an internal bus 120, a CPU 121, a flash ROM 122, a synchronous RAM (SDRAM) 123, a display controller 124, a remote controller receiver 125, a remote controller transmitter 126, and a power source 127. Note that the "ethernet" and "Ethernet" are registered trademarks.

The CPU 121 is configured to control operation of each unit of the television receiver 100. The flash ROM 122 is configured to store control software and keep data. The DRAM 123 forms a work area of the CPU 121. The CPU 121 loads the software or data read from the flash ROM 122 onto the SDRAM 123 to activate the software, thereby controlling each unit of the television receiver 100.

The remote controller receiver 125 is configured to receive a remote control signal (a remote controller code) transmitted from the remote controller transmitter 126, thereby supplying the remote control signal to the CPU 121. The CPU 121 controls each unit of the television receiver 100 on the basis of the remote controller code. Note that in this embodiment, a remote controller is described as a user instruction inputter, but the user instruction inputter may have other configurations such as a touch panel configured to perform instruction input via proximity detection/touch, a gesture inputter configured to detect instruction input via a mouse, a keyboard, or a camera, an audio inputter configured to perform instruction input via audio, and the like.

The antenna terminal 105 is a terminal to which a telecasting signal received by the receiving antenna (not shown) is input. The digital tuner 106 is configured to process the telecasting signal input to the antenna terminal 105, thereby extracting a partial transport stream (TS) (a video data TS packet, an audio data TS packet) from a predetermined transport stream corresponding to a channel selected by a user.

Moreover, the digital tuner 106 is configured to extract program specific information/service information (PSI/SI) from the obtained transport stream, thereby outputting the PSI/SI to the CPU 121. The processing of extracting a partial TS for an optional channel from multiple transport streams obtained by the digital tuner 106 is allowed in such a manner that information regarding a packet ID (PID) for the optional channel is obtained from the PSI/SI (PAT/PMT).

The MPEG decoder 107 is configured to perform decoding processing for a video packetized elementary stream (PES) packet including the video data TS packet obtained by the digital tuner 106, thereby obtaining image data. Moreover, the MPEG decoder 107 is configured to perform the decoding processing for an audio PES packet including the audio data TS packet obtained by the digital tuner 106, thereby obtaining audio data.

The video signal processing circuit 108 and the graphic generation circuit 109 are configured to perform, as necessary, scaling processing (resolution conversion processing) and graphics data superimposing processing for the image data obtained by the MPEG decoder 107 or image data received by the HDMI receiver 102, for example.

The panel drive circuit 110 is configured to drive the display panel 111 on the basis of video (image) data output from the graphic generation circuit 109. The display controller 124 is configured to control the graphics generation circuit 109 and the panel drive circuit 110, thereby controlling an indication on the display panel 111. The display panel 111 includes, for example, a liquid crystal display (LCD), a plasma display panel (PDP), an organic electro-luminescence panel (an organic EL panel), and the like.

Note that this embodiment describes an example where the display controller 124 is provided in addition to the CPU 121, but the CPU 121 may directly control the indication on the display panel 111. Moreover, the CPU 121 and the display controller 124 may be formed as a single chip or multiple cores. The power source 127 is configured to supply power to each unit of the television receiver 100. The power source 127 may be an AC power source or a battery (a secondary battery, a dry-cell battery).

The audio signal processing circuit 112 is configured to perform necessary processing such as D/A conversion for the audio data obtained by the MPEG decoder 107. The audio amplification circuit 113 is configured to amplify an audio signal output from the audio signal processing circuit 112, thereby supplying the audio signal to the speaker 114. Note that the speaker 114 may be monaural or stereo. Moreover, one speaker 114 or two or more speakers 114 may be provided. Further, the speaker 114 may be earphones or headphones. In addition, the speaker 114 may adapt to a 2.1 channel or a 5.1 channel, for example. Moreover, the speaker 114 may be wirelessly connected to the television receiver 100. Further, the speaker 114 may be other devices.

The network terminal 116 is a terminal connected to a network, and is connected to the Ethernet interface 115. The CPU 121, the flash ROM 122, the SDRAM 123, the Ethernet interface 115, and the display controller 124 are connected to the internal bus 120.

The HDMI receiver (an HDMI sink) 102 is configured to receive, by communication in accordance with an HDMI, baseband image (video) and audio data supplied to the HDMI terminal 101 via the HDMI cable. The high-speed bus interface 103 is an interface for a two-way communication channel formed using a reserve line and an HPD line forming the HDMI cable.

The SPDIF transmission circuit 104 is a circuit configured to transmit a digital audio transfer signal (hereinafter referred to as a "SPDIF signal" as necessary) in accordance with IEC 60958 standards. The SPDIF transmission circuit 104 is a transmission circuit in accordance with the IEC 60958 standards. In this embodiment, the SPDIF transmission circuit 104 uses audio data SA for each channel of two channels or multiple channels, thereby generating the SPDIF signal containing the audio data for each channel.

The audio data SA is, for example, obtained by the MPEG decoder 107, and may include, for example, audio data for a 2 channel, the 5.1 channel, a 7.1 channel, a 10.2 channel, and a 22.2 channel. In this embodiment, linear PCM audio data for each channel in the SPDIF signal generated by the SPDIF transmission circuit 104 is encrypted. Details of the SPDIF signal and encryption will be described later.

The high-speed bus interface 103 is inserted between the Ethernet interface 115 and the HDMI terminal 101. The high-speed bus interface 103 is configured to supply reception data to the CPU 121 via the Ethernet interface 115, the reception data being received from a partner device via the HDMI terminal 101 by means of the HDMI cable.

Moreover, the high-speed bus interface 103 is configured to transmit transmission data to the partner device via the HDMI terminal 101 by means of the HDMI cable, the transmission data being supplied from the CPU 121 via the Ethernet interface 115. Further, the high-speed bus interface 103 is configured to transmit the SPDIF signal generated by the SPDIF transmission circuit 104 to the partner device via the HDMI terminal 101 by means of the HDMI cable.

Note that when received contents data is, for example, delivered to the network, such contents data is output to the network terminal 116 via the Ethernet interface 115. Similarly, when the received contents data is delivered to the two-way communication channel of the HDMI cable, such contents data is output to the HDMI terminal 101 via the Ethernet interface 115 and the high-speed bus interface 103. In this case, before the image data is output, encryption may be performed using a copyright protection technique such as HDCP, DTCP, DTCP+, or the like, to perform transmission.

Operation of the television receiver 100 illustrated in FIG. 2 will be briefly described. The telecasting signal input to the antenna terminal 105 is supplied to the digital tuner 106. In the digital tuner 106, the telecasting signal is processed to output the predetermined transport stream corresponding to the channel selected by the user, and the partial TS (the video data TS packet, the audio data TS packet) is extracted from the transport stream and is supplied to the MPEG decoder 107.

In the MPEG decoder 107, the decoding processing is performed for the video PES packet including the video data TS packet, and in this manner, the video data is obtained. Such video data is, as necessary, subjected to the scaling processing (the resolution conversion processing), the graphics data superimposing processing, etc. in the video signal processing circuit 108 and the graphic generation circuit 109, and then, is supplied to the panel drive circuit 110. Thus, an image corresponding to the channel selected by the user is displayed on the display panel 111.

Moreover, in the MPEG decoder 107, the decoding processing is performed for the audio PES packet including the audio data TS packet, and in this manner, the audio data is obtained. Such audio data is subjected to necessary processing such as D/A conversion in the audio signal processing circuit 112, and is amplified in the audio amplification circuit 113. Thereafter, the audio data is supplied to the speaker 114. Thus, audio corresponding to the channel selected by the user is output from the speaker 114.

Moreover, the contents data (the image data, the audio data) supplied from the network terminal 116 to the Ethernet interface 115 or supplied from the HDMI terminal 101 to the Ethernet interface 115 via the high-speed bus interface 103 is supplied to the MPEG decoder 107. Subsequently, operation similar to that in reception of the telecasting signal as described above is performed such that the image is displayed on the display panel 111 and the audio is output from the speaker 114.

Further, in the HDMI receiver 102, the image data and the audio data transmitted to the HDMI terminal 101 via the HDMI cable are obtained. The image data is supplied to the video signal processing circuit 108. Moreover, the audio data is supplied to the audio signal processing circuit 112. Subsequently, operation similar to that in reception of the telecasting signal as described above is performed such that the image is displayed on the display panel 111 and the audio is output from the speaker 114.

In addition, the SPDIF signal generated in the SPDIF transmission circuit 104 and containing the audio data for each channel of the two channels or the multiple channels is supplied to the high-speed bus interface 103. Then, the SPDIF signal is, by the high-speed bus interface 103, transmitted from the HDMI terminal 101 to the audio amplifier 200 via the HDMI cable 610.

[Configuration Example of Audio Amplifier]

Figure 3:
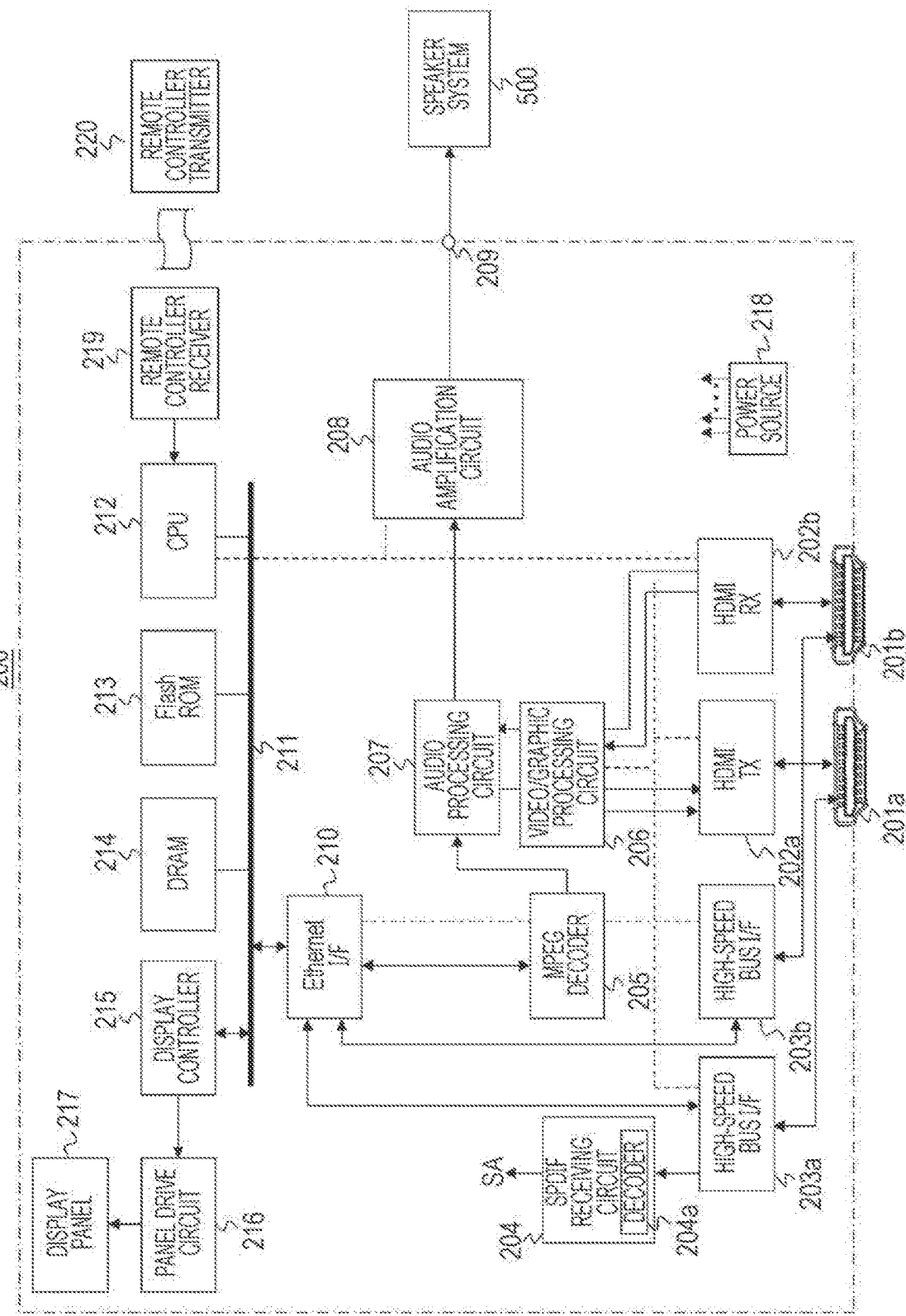
FIG. 3 is a block diagram of a configuration example of an audio amplifier forming the AV system.

FIG. 3 illustrates a configuration example of the audio amplifier 200. The audio amplifier 200 has the HDMI terminals 201a and 201b, the HDMI transmitter 202a, the HDMI receiver 202b, the high-speed bus interfaces 203a and 203b, and the SPDIF receiving circuit 204.

Moreover, the audio amplifier 200 has an MPEG decoder 205, a video/graphic processing circuit 206, an audio processing circuit 207, an audio amplification circuit 208, and an audio output terminal 209. Further, the audio amplifier 200 has the Ethernet interface 210, an internal bus 211, a CPU 212, a flash ROM 213, a DRAM 214, a display controller 215, a panel drive circuit 216, a display panel 217, a power source 218, a remote controller receiver 219, and a remote controller transmitter 220.

The CPU 212 is configured to control operation of each unit of the audio amplifier 200. The flash ROM 213 is configured to store control software and keep data. The DRAM 214 forms a work area of the CPU 212. The CPU 212 loads the software or data read from the flash ROM 213 onto the DRAM 214 to activate the software, thereby controlling each unit of the audio amplifier 200. The CPU 212, the flash ROM 213, the DRAM 214, the Ethernet interface 210, and the display controller 215 are connected to the internal bus 211.

The remote controller receiver 219 is configured to receive a remote control signal (a remote controller code) transmitted from the remote controller transmitter 220, thereby supplying the remote control signal to the CPU 212. The CPU 212 controls each unit of the audio amplifier 200 on the basis of the remote controller code. Note that in this embodiment, a remote controller is described as a user instruction inputter, but the user instruction inputter may have other configurations such as a touch panel configured to perform instruction input via proximity detection/touch, a gesture inputter configured to detect instruction input via a mouse, a keyboard, or a camera, an audio inputter configured to perform instruction input via audio, and the like.

The HDMI transmitter (an HDMI source) 202a is configured to deliver, by communication in accordance with the HDMI, baseband video (image) and audio data from the HDMI terminal 201a to the HDMI cable. The HDMI receiver (an HDMI sink) 202b is configured to receive, by communication in accordance with the HDMI, baseband video (image) and audio data supplied to the HDMI terminal 201b via the HDMI cable. Details of the HDMI transmitter 202a and the HDMI receiver 202b will be described later.

The high-speed bus interfaces 203a and 203b are interfaces for two-way communication using the reserve line and the HPD line forming the HDMI cable. Details of the high-speed bus interfaces 203a and 203b will be described later. The SPDIF receiving circuit 204 is a circuit configured to receive a SPDIF signal (a digital audio transmission signal in accordance with the IEC 60958 standards). The SPDIF receiving circuit 204 is a receiving circuit in accordance with the IEC 60958 standards.

In this embodiment, the SPDIF receiving circuit 204 receives the SPDIF signal containing audio data for each channel of the two channels or the multiple channels, thereby outputting the audio data for each channel. In this embodiment, the linear PCM audio data for each channel in the SPDIF signal is encrypted. Thus, the SPDIF receiving circuit 204 performs encryption processing for the linear PCM audio data for each channel, thereby obtaining the audio data for each channel.

The MPEG decoder 205 is configured to decode a partial TS supplied to the Ethernet interface 210 via the high-speed bus interface 203a. In this case, the decoding processing is performed for an audio PES packet of the partial TS, and in this manner, the audio data is obtained.

The audio processing circuit 207 is configured to perform necessary processing such as D/A conversion for the audio data for each channel of the two channels or the multiple channels, the audio data being obtained by the MPEG decoder 205 or being received by the SPDIF receiving circuit 204. The audio amplification circuit 208 is configured to amplify an audio signal, which is obtained by the audio processing circuit 207, for each channel of the two channels or the multiple channels, thereby outputting the audio signal to the audio output terminal 209. Note that the 2-channel or multichannel speaker system 500 is connected to the audio output terminal 209.

Further, the audio processing circuit 207 is configured to perform necessary processing for the audio data obtained by the HDMI receiver 202b and subsequently supply the audio data to the HDMI transmitter 202a. The video/graphic processing circuit 206 is configured to supply, after the processing such as graphics data superimposition has been performed, the video (image) data obtained by the HDMI receiver 202b to the HDMI transmitter 202a.

The display controller 215 is, for example, configured to control the panel drive circuit 216 and control an indication on the display panel 217 for displaying a user interface, the status of the audio amplifier 200, or the like. The display panel 217 includes, for example, a liquid crystal display (LCD), an organic electro-luminescence panel (an organic EL panel), and the like.

Note that this embodiment describes an example where the display controller 215 is provided in addition to the CPU 212, but the CPU 212 may directly control the indication on the display panel 217. Moreover, the CPU 212 and the display controller 215 may be formed as a single chip or multiple cores. The power source 218 is configured to supply power to each unit of the audio amplifier 200. The power source 218 may be an AC power source or a battery (a secondary battery, a dry-cell battery).

Operation of the audio amplifier 200 illustrated in FIG. 3 will be briefly described. In the HDMI receiver 202b, video (image) data and the audio data transmitted from the BD player 300 to the HDMI terminal 201b via the HDMI cable 620 are obtained. The video data and the audio data are each supplied to the HDMI transmitter 202a via the video/graphic processing circuit 206 and the audio processing circuit 207, and are transmitted to the television receiver 100 via the HDMI cable 610 connected to the HDMI transmitter 202a.

In the high-speed bus interface 203a, the partial TS transmitted from the television receiver 100 via a predetermined line of the HDMI cable 610 connected to the HDMI terminal 201a is received. This partial TS is supplied to the MPEG decoder 205 via the Ethernet interface 211. In the MPEG decoder 205, the decoding processing is performed for the audio data PES packet forming the partial TS, and in this manner, the audio data for each channel of the two channels or the multiple channels is obtained.

Such audio data is supplied to the audio processing circuit 207, and then, is subjected to necessary processing such as D/A conversion. Then, when muting is in an OFF state, the audio signal, which is output from the audio processing circuit 207, for each channel is amplified and is output to the audio output terminal 209. Thus, 2-channel or multichannel audio output is obtained from the speaker system 500.

Moreover, in the high-speed bus interface 203a, the SPDIF signal transmitted from the television receiver 100 via the predetermined line of the HDMI cable 610 connected to the HDMI terminal 201a and containing the audio data for each channel of the two channels or the multiple channels is received. This SPDIF signal is supplied to the SPDIF receiving circuit 204. In the SPDIF receiving circuit 204, the SPDIF signal is processed such that the audio data for each channel of the two channels or the multiple channels is obtained.

Such audio data is supplied to the audio processing circuit 207, and then, is subjected to necessary processing such as D/A conversion. Then, when muting is in the OFF state, the audio signal, which is output from the audio processing circuit 207, for each channel is amplified and is output to the audio output terminal 209. Thus, the 2-channel or multichannel audio output is obtained from the speaker system 500.

Note that the partial TS received by the high-speed bus interface 203a and supplied to the Ethernet interface 210 as described above is, as transmission data, supplied to the high-speed bus interface 203b. Thus, such a partial TS is transmitted to the BD player 300 via the HDMI cable 620 connected to the HDMI terminal 201b.

[Configuration Example of BD Player]

Figure 4:
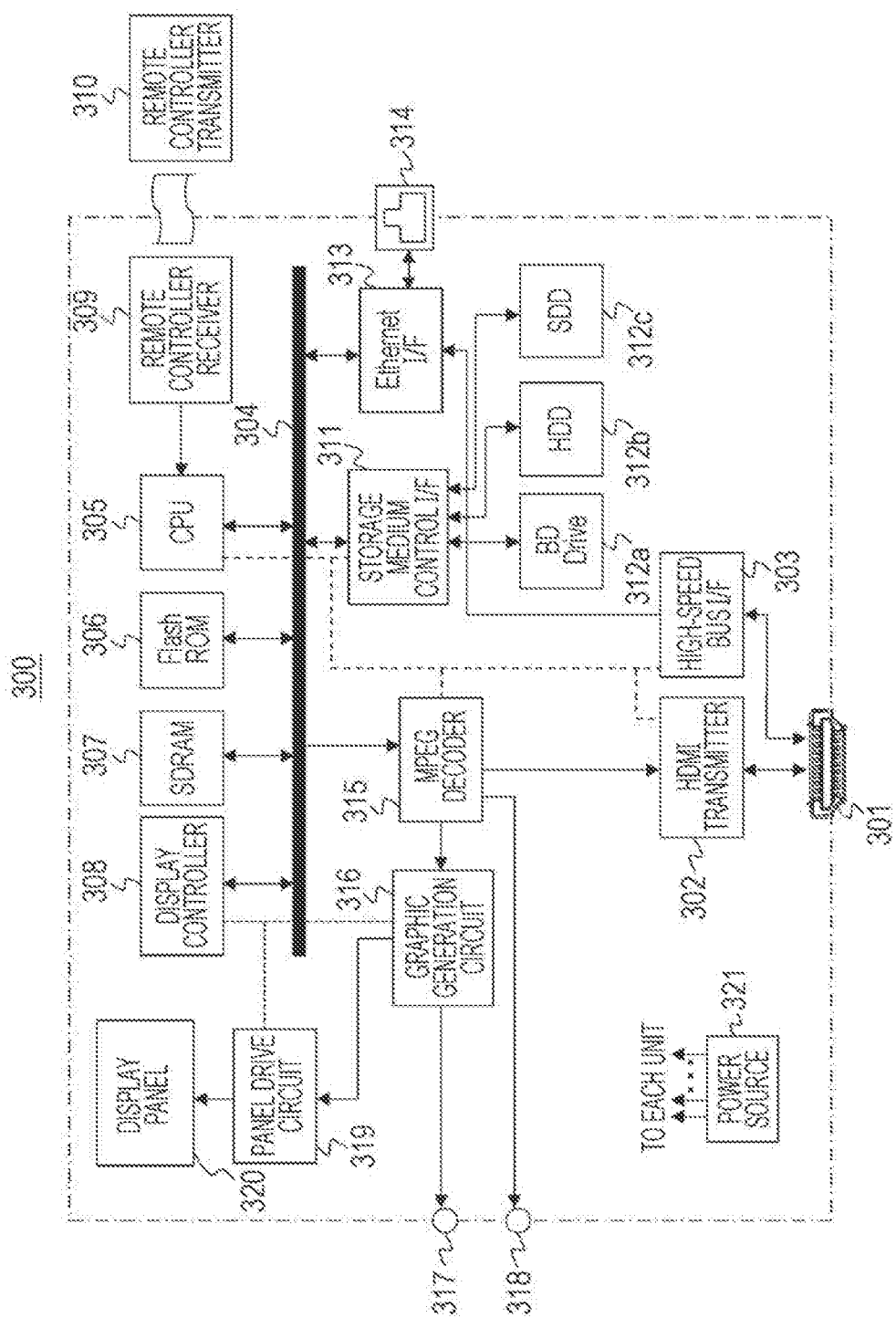
FIG. 4 is a block diagram of a configuration example of a BD player forming the AV system.

FIG. 4 illustrates a configuration example of the BD player 300. The BD player 300 has the HDMI terminal 301, the HDMI transmitter 302, and the high-speed bus interface 303. Moreover, the BD player 300 has an internal bus 304, a central processing unit (CPU) 305, a flash read only memory (ROM) 306, a synchronous random access memory (SDRAM) 307, a display controller 308, a remote controller receiver 309, and a remote controller transmitter 310.

Further, the BD player 300 has a storage (recording) medium control interface 311, a Blu-Ray disc (BD) drive 312a, a hard disk drive (HDD) 312b, a solid state drive (SSD) 312c, an Ethernet interface (Ethernet I/F) 313, and a network terminal 314. In addition, the BD player 300 has a moving picture expert group (MPEG) decoder 315, a graphic generation circuit 316, a video output terminal 317, and an audio output terminal 318.

Moreover, the BD player 300 has a panel drive circuit 319, a display panel 320, and a power source 321. The CPU 305, the flash ROM 306, the SDRAM 307, the storage medium control interface 311, the Ethernet interface 313, and the MPEG decoder 315 are connected to the internal bus 304.

The CPU 305 is configured to control operation of each unit of the BD player 300. The flash ROM 306 is configured to store control software and keep data. The SDRAM 307 forms a work area of the CPU 305. The CPU 305 loads the software or data read from the flash ROM 306 onto the SDRAM 307 to activate the software, thereby controlling each unit of the BD player 300.

The remote controller receiver 309 is configured to receive a remote control signal (a remote controller code) transmitted from the remote controller transmitter 310, thereby supplying the remote control signal to the CPU 305. The CPU 305 controls each unit of the BD player 300 according to the remote controller code. Note that in this embodiment, a remote controller is described as a user instruction inputter, but the user instruction inputter may have other configurations such as a touch panel configured to perform instruction input via a switch, a wheel, or proximity detection/touch, a gesture inputter configured to detect instruction input via a mouse, a keyboard, or a camera, an audio inputter configured to perform instruction input via audio, and the like.

The BD drive 312a is configured to record contents data in a BD disc as a disc-shaped recording medium or reproduce the contents data from the BD disc. The HDD 312b is configured to record contents data or reproduce such contents data. The SSD 312c is configured to record contents data in a semiconductor memory such as a memory card or reproduce the contents data from the semiconductor memory.

The BD drive 312a, the HDD 312b, and the SSD 312c are connected to the internal bus 304 via the storage medium control interface 311. For example, a SATA interface is used as an interface for the BD drive 312a or the HDD 312b. Moreover, a SATA interface or a PCIe interface is used as an interface for the SSD 312c, for example.

The MPEG decoder 315 is configured to perform the decoding processing for a MPEG2 stream reproduced in the BD drive 312a, the HDD 312b, or the SSD 312c, thereby obtaining image and audio data. The graphic generation circuit 316 is configured to perform, as necessary, graphics data superimposing processing etc. for the image data obtained by the MPEG decoder 315. The video output terminal 317 is configured to output the image data output from the graphic generation circuit 316. The audio output terminal 318 is configured to output the audio data obtained by the MPEG decoder 315.

The panel drive circuit 319 is configured to drive the display panel 320 on the basis of the video (image) data output from the graphic generation circuit 316. The display controller 308 is configured to control the graphics generation circuit 316 and the panel drive circuit 319, thereby controlling an indication on the display panel 320. The display panel 320 includes, for example, a liquid crystal display (LCD), a plasma display panel (PDP), an organic electro-luminescence panel (an organic EL panel), and the like.

Note that this embodiment describes an example where the display controller 308 is provided in addition to the CPU 305, but the CPU 305 may directly control the indication on the display panel 320. Moreover, the CPU 305 and the display controller 308 may be formed as a single chip or multiple cores. The power source 321 is configured to supply power to each unit of the BD player 300. The power source 321 may be an AC power source or a battery (a secondary battery, a dry-cell battery).

The HDMI transmitter (an HDMI source) 302 is configured to deliver, by communication in accordance with the HDMI, baseband image (video) and audio data from the HDMI terminal 301. The high-speed bus interface 303 is an interface for the two-way communication channel formed using the reserve line and the HPD line forming the HDMI cable.

The high-speed bus interface 303 is inserted between the Ethernet interface 313 and the HDMI terminal 301. The high-speed bus interface 303 is configured to transmit transmission data from HDMI terminal 301 to a partner device via the HDMI cable, the transmission data being supplied from the CPU 305. Moreover, the high-speed bus interface 303 is configured to supply reception data to the CPU 305, the reception data being received from the partner device via the HDMI terminal 301 by way of the HDMI cable.

Operation of the BD player 300 illustrated in FIG. 4 will be briefly described. In recording, contents data to be recorded is acquired via a not-shown digital tuner, via the Ethernet interface 311 from the network terminal 314, or via the high-speed bus interface 303 from the HDMI terminal 301. Such contents data is input to the storage medium control interface 311, and is recorded in the BD disc by the BD drive 312a, in the HDD 312b, or in the semiconductor memory by the SSD 312c.

In reproduction, the contends data (a MPEG stream) reproduced in the BD drive 312a, the HDD 312b, or the SSD 312c is supplied to the MPEG decoder 315 via the storage medium control interface 311. In the MPEG decoder 315, the decoding processing is performed for the reproduced contents data, and in this manner, the baseband image and audio data is obtained. The image data is output to the video output terminal 317 via the graphic generation circuit 316. Moreover, the audio data is output to the audio output terminal 318.

Moreover, in reproduction, the image data obtained by the MPEG decoder 315 is supplied to the panel drive circuit 319 via the graphic generation circuit 316 according to user operation, and a reproduction image is displayed on the display panel 320. Moreover, the audio data obtained by the MPEG decoder 315 is supplied to a not-shown speaker according to user operation, and audio corresponding to the reproduction image is output.

Further, in reproduction, in a case where the image and audio data obtained by the MPEG decoder 315 is transmitted on TMDS channels of the HDMI, such image and audio data is supplied to the HDMI transmitter 302 and is packed, and then, is output from the HDMI transmitter 302 to the HDMI terminal 301.

In addition, in reproduction, when the contents data reproduced in the BD drive 312a, the HDD 312b, or the SSD 312c is delivered to the network, such contents data is output to the network terminal 314 via the Ethernet interface 313. Similarly, in reproduction, when the contents data reproduced in the BD drive 312a, the HDD 312b, or the SSD 312c is delivered to the two-way communication channel of the HDMI cable 620, such contents data is output to the HDMI terminal 301 via the high-speed bus interface 303. In this case, before the image data is output, encryption may be performed using the copyright protection technique such as HDCP, DTCP, DTCP+, or the like to perform transmission.

"Configuration Example of HDMI Transmitter/Receiver"

Figure 5:
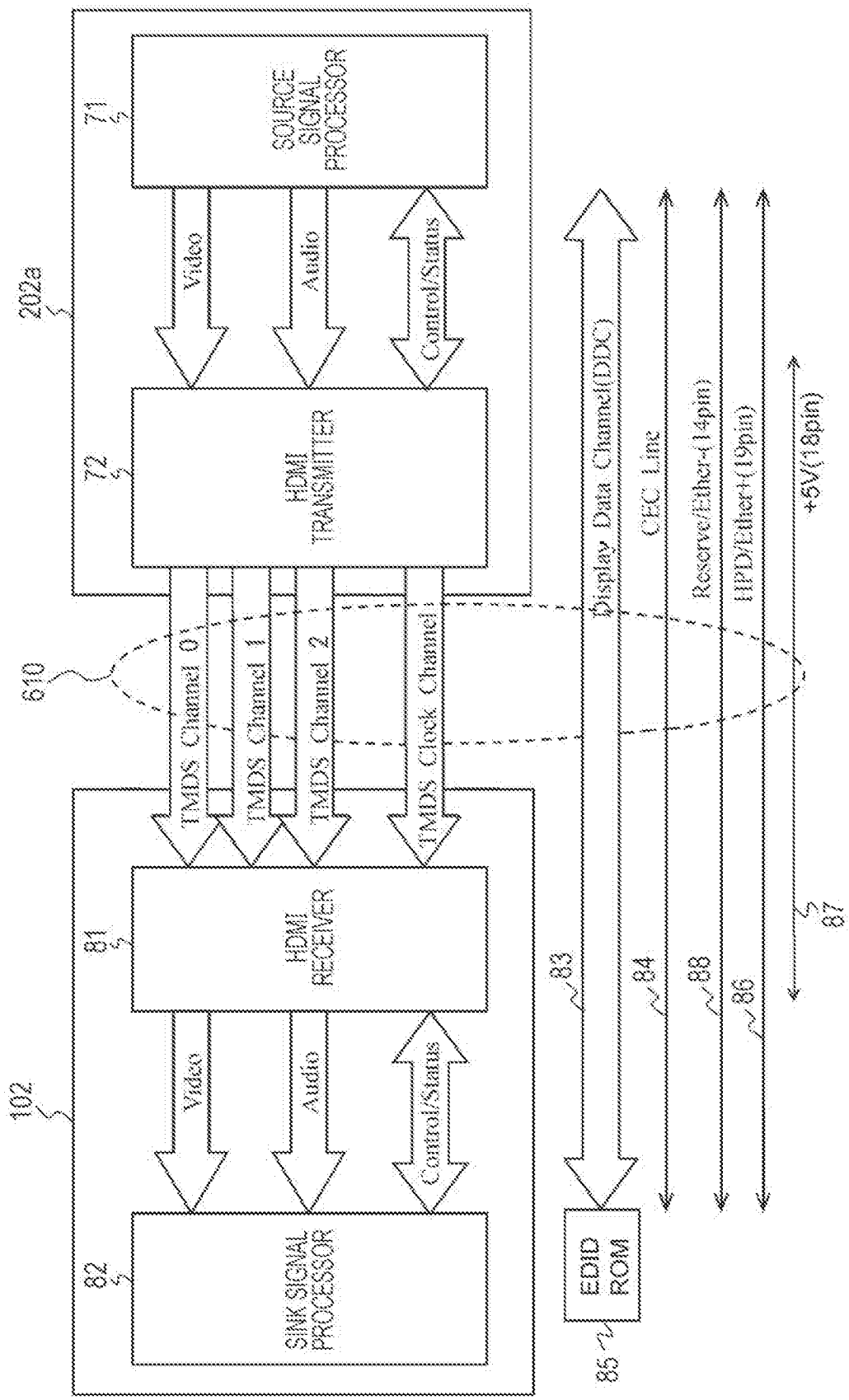
FIG. 5 is a block diagram of a configuration example of an HDMI receiver of the television receiver and an HDMI transmitter of the audio amplifier.

FIG. 5 illustrates configuration examples of the HDMI receiver 102 of the television receiver 100 and the HDMI transmitter 202a of the audio amplifier 200 in the AV system 10 of FIG. 1. Note that regarding configuration examples of the HDMI receiver 202b of the audio amplifier 200 and the HDMI transmitter 302 of the BD player 300, similar configurations are employed, and therefore, description will be omitted.

In an effective image section (hereinafter referred to as an "active video section" as necessary) as a section obtained by exclusion of a horizontal blanking period and a vertical blanking period from a section (hereinafter referred to as a "video field" as necessary) from a certain vertical synchronous signal to a subsequent vertical synchronous signal, the HDMI transmitter 202a transmits a baseband (uncompressed) image data differential signal for a single screen to the HDMI receiver 102 in one direction on multiple channels. Moreover, in the horizontal blanking period and the vertical blanking period, the HDMI transmitter 202a transmits differential signals corresponding to, e.g., audio data, a control packet (Control Packet), and other types of auxiliary data associated with the image data to the HDMI receiver 102 in one direction on the multiple channels.

The HDMI transmitter 202a has a source signal processor 71 and an HDMI transmitter 72. Baseband uncompressed image (Video) and audio (Audio) data are supplied to the source signal processor 71. The source signal processor 71 is configured to perform necessary processing for the supplied image and audio data, thereby supplying the data to the HDMI transmitter 72. Moreover, the source signal processor 71 is configured to exchange, as necessary, control information or information for providing notification of a status (Control/Status) etc. with the HDMI transmitter 72.

The HDMI transmitter 72 is configured to convert the image data supplied from the source signal processor 71 into a corresponding differential signal, thereby transmitting the differential signal to the HDMI receiver 102 connected via the HDMI cable 610 in one direction on three TMDS channels #0, #1, #2 as the multiple channels.

Further, the audio data, the control packet, and other types of auxiliary data (auxiliary data) associated with the uncompressed image data from the transmitter 72 and the source signal processor 71 and control data (control data) such as the vertical synchronous signal (VSYNC) and a horizontal synchronous signal (HSYNC) are converted into corresponding differential signals, and the differential signals are, in one direction, transmitted to the HDMI receiver 102 connected via the HDMI cable 610 on three TMDS channels #0, #1, #2.

In addition, the transmitter 72 transmits, on a TMDS clock channel, a pixel clock synchronized with the image data transmitted on three TMDS channels #0, #1, #2 to the HDMI receiver 102 connected via the HDMI cable 610.

The HDMI receiver 102 receives, in the active video section, the differential signal corresponding to the image data and transmitted in one direction from the HDMI transmitter 202a on the multiple channels, and receives, in the horizontal blanking period and the vertical blanking period, the differential signals corresponding to the auxiliary data and the control data and transmitted from the HDMI transmitter 202a on the multiple channels.

The HDMI receiver 102 has an HDMI receiver 81 and a sink signal processor 82. The HDMI receiver 81 is configured to receive, in synchronization with the pixel clock transmitted from the HDMI transmitter 202a connected via the HDMI cable 610 on the TMDS clock channel, the differential signal corresponding to the image data and the differential signals corresponding to the auxiliary data and the control data, the differential signals being similarly transmitted from the HDMI transmitter 202a in one direction on the TMDS channels #0, #1, #2. Further, the HDMI receiver 81 is configured to convert the differential signals into the corresponding image data, auxiliary data, and control data, thereby supplying the data to the sink signal processor 82 as necessary.

The sink signal processor 82 is configured to perform necessary processing for the data supplied from the HDMI receiver 81, thereby outputting the data. In addition, the sink signal processor 82 is configured to exchange, as necessary, control information or information for providing notification of a status (Control/Status) etc. with the HDMI receiver 81.

HDMI transfer channels include not only three TMDS channels #0, #1, #2 for one-directional serial transmission of the image data, the auxiliary data, and the control data from the HDMI transmitter 202a to the HDMI receiver 102 in synchronization with the pixel clock and the TMDS clock channel as a transfer channel for transferring the pixel clock, but also a display data channel (DDC) 83 and a transfer channel called a CEC line 84.

The DDC 83 includes not-shown two lines (signal lines) included in the HDMI cable 610, and is used for reading enhanced-extended display identification (E-EDID) from the sink device connected via the HDMI cable 610 by the source device. That is, the sink device has an EDIDROM 85. The source device reads the E-EDID stored in the EDIDROM 85 from the sink device connected via the HDMI cable 610 by means of the DDC 83, and recognizes settings and performance of the sink device on the basis of the E-EDID.

The CEC line 84 includes a not-shown single line included in the HDMI cable 610, and is used for performing two-way communication of the control data between the source device and the sink device.

Moreover, the HDMI cable 610 includes a line 86 connected to a pin called a hot plug detect (HPD). The source device utilizes the line 86 so that connection of the sink device can be detected. Further, the HDMI cable 610 includes a line 87 used for supplying power from the source device to the sink device. In addition, the HDMI cable 610 includes a reserve line 88.

Figure 6:
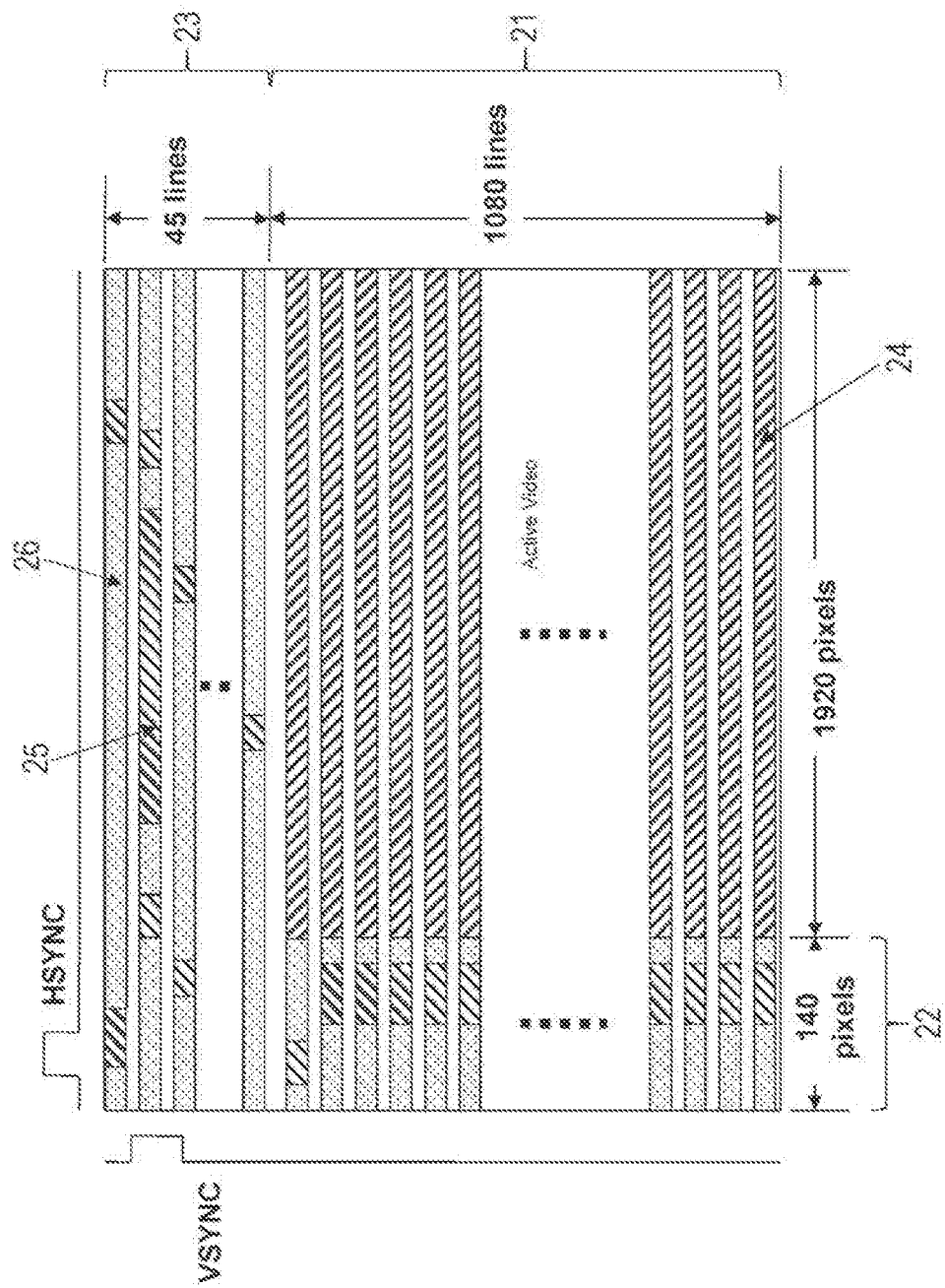
FIG. 6 is a view of various transfer data sections in the case of transferring image data of 1920 pixels×1080 lines in rows and columns on TMDS channels.

FIG. 6 illustrates various transfer data sections in the case of transferring image data of 1920 pixels×1080 lines in rows and columns on the TMDS channels. In the video field (Video Field) where transfer data is transferred on three TMDS channels of the HDMI, three types of sections including a video data section 24 (Video Data Period), a data island section 25 (Data Island Period), and a control section 26 (Control Period) are present according to the type of transfer data.

The video field section described herein is a section from a rising edge (Active Edge) of a certain vertical synchronous signal to a riding edge of a subsequent vertical synchronous signal, and is divided into a horizontal retrace line period 22 (Horizontal Blanking), a vertical retrace line period 23 (Vertical Blanking), and an effective pixel section 21 (Active Video) as a section obtained by excluding the horizontal retrace line period and the vertical retrace line period from the video field section.

The video data section 24 is assigned to the effective pixel section 21. In the video data section 24, data of effective pixels (Active Pixel) of 1920 pixels (imaging elements)× 1080 lines forming uncompressed image data for a single screen is transferred. The data island section 25 and the control section 26 are assigned to the horizontal retrace line period 22 and the vertical retrace line period 23. In the data island section 25 and the control section 26, the auxiliary data (Auxiliary Data) is transferred.

That is, the data island section 25 is assigned to portions of the horizontal retrace line period 22 and the vertical retrace line period 23. In the data island section 25, data of the auxiliary data not relating to control, such as an audio data packet or the like, is transferred. The control section 26 is assigned to other portions of the horizontal retrace line period 22 and the vertical retrace line period 23. In the control section 26, data of the auxiliary data relating to the control, such as the vertical synchronous signal, the horizontal synchronous signal, the control packet, and the like is transferred.

FIG. 7 illustrates pin assignment of an HDMI connector. This pin assignment is an example of a type A (type-A). Two lines as differential lines for transferring TMDS Data #i+ and TMDS Data #i− as differential signals of a TMDS channel #i are connected to pins (pins with pin numbers of 1, 4, and 7) to which the TMDS Data #i+ is assigned and pins (pins with pin numbers of 3, 6, and 9) to which the TMDS Data #i− is assigned.

Moreover, the CEC line 84 for transferring a CEC signal as the control data is connected to a pin with a pin number of 13, and a pin with a pin number of 14 is an idle (Reserved) pin. Further, the line for transferring a serial data (SDA) signal such as E-EDID is connected to a pin with a pin number of 16, and the line for transferring a serial clock (SCL) signal as a clock signal used for synchronization in reception/transmission of the SDA signal is connected to a pin with a pin number of 15. The above-described DDC 83 includes the line for transferring the SDA signal and the line for transferring the SCL signal.

Moreover, the HPD line 86 for detecting connection of the sink device by the source device as described above is connected to a pin with a pin number of 19. Further, the power source line 87 for supplying power as described above is connected to a pin with a pin number of 18.

"Configuration Example of High-Speed Bus Interface"

Figure 8:
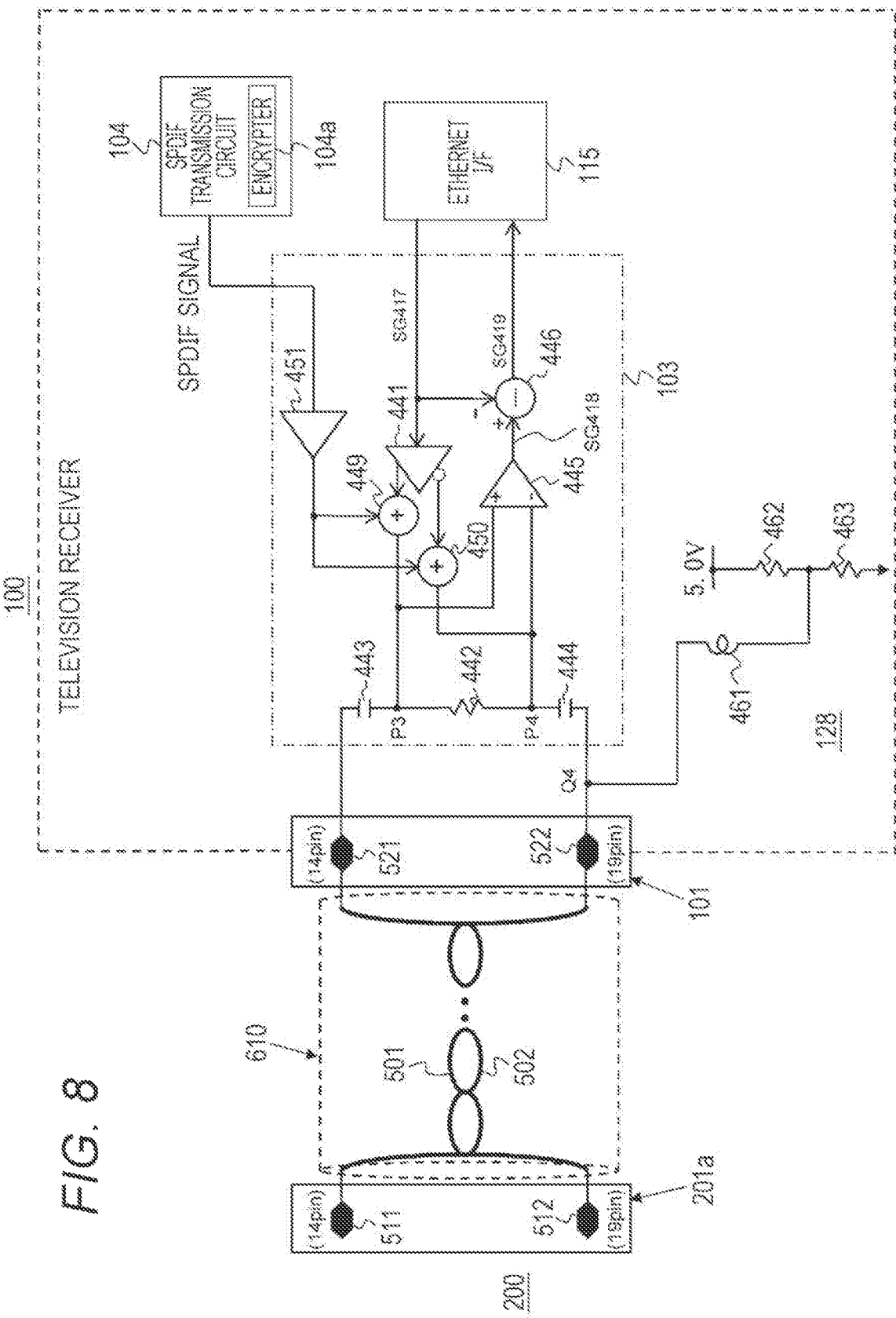
FIG. 8 is a diagram of a configuration example of a high-speed bus interface of the television receiver.

FIG. 8 illustrates a configuration example of the high-speed bus interface 103 of the television receiver 100 in the AV system 10 of FIG. 1. The Ethernet interface 115 is configured to perform local area network (LAN) communication, i.e., reception/transmission of an Ethernet signal, by means of a transfer channel including a pair of the reserve line and the HPD line of the multiple lines forming the HDMI cable 610. The SPDIF transmission circuit 104 is configured to transmit the SPDIF signal by means of the transfer channel including the pair of lines as described above.

The television receiver 100 has a LAN signal transmission circuit 441, a terminating resistor 442, AC coupling capacitors 443 and 444, a LAN signal receiving circuit 445, a subtraction circuit 446, addition circuits 449 and 450, and an amplifier 451. These components form the high-speed bus interface 103. Moreover, the television receiver 100 has a choke coil 461, a resistor 462, and a resistor 463, these components forming a plug connection transmission circuit 128.

A series circuit of the AC coupling capacitor 443, the terminating resistor 442, and the AC coupling capacitor 444 is connected to between a 14 pin terminal 521 and a 19 pin terminal 522 of the HDMI terminal 101. Moreover, a series circuit of the resistor 462 and the resistor 463 is connected to between the power source line (+5.0 V) and a grounding line. Further, a connection point between the resistor 462 and the resistor 463 is connected to a connection point Q4 between the 19 pin terminal 522 and the AC coupling capacitor 444 via the choke coil 461.

A connection point P3 between the AC coupling capacitor 443 and the terminating resistor 442 is connected to an output side of the addition circuit 449, and is connected to a positive input side of the LAN signal receiving circuit 445. Moreover, a connection point P4 between the AC coupling capacitor 444 and the terminating resistor 442 is connected to an output side of the addition circuit 450, and is connected to a negative input side of the LAN signal receiving circuit 445.

One input side of the addition circuit 449 is connected to a positive output side of the LAN signal transmission circuit 441, and the SPDIF signal output from the SPDIF transmission circuit 104 is supplied to the other input side of the addition circuit 449 via the amplifier 451. Moreover, one input side of the addition circuit 450 is connected to a negative output side of the LAN signal transmission circuit 441, and the SPDIF signal output from the SPDIF transmission circuit 104 is supplied to the other input side of the addition circuit 450 via the amplifier 451.

A transmission signal (transmission data) SG417 is supplied from the Ethernet interface 115 to an input side of the LAN signal transmission circuit 441. Moreover, an output signal SG418 of the LAN signal receiving circuit 445 is supplied to a positive terminal of the subtraction circuit 446, and the transmission signal SG417 is supplied to a negative terminal of the subtraction circuit 446. In the subtraction circuit 446, the transmission signal SG417 is subtracted from the output signal SG418 of the LAN signal receiving circuit 445, and a reception signal (reception data) SG419 is obtained. The reception signal SG419 is a LAN signal (an Ethernet signal) in a case where the LAN signal is transmitted as a differential signal via the reserve line and the HPD line. The reception signal SG419 is supplied to the Ethernet interface 115.

Figure 9:
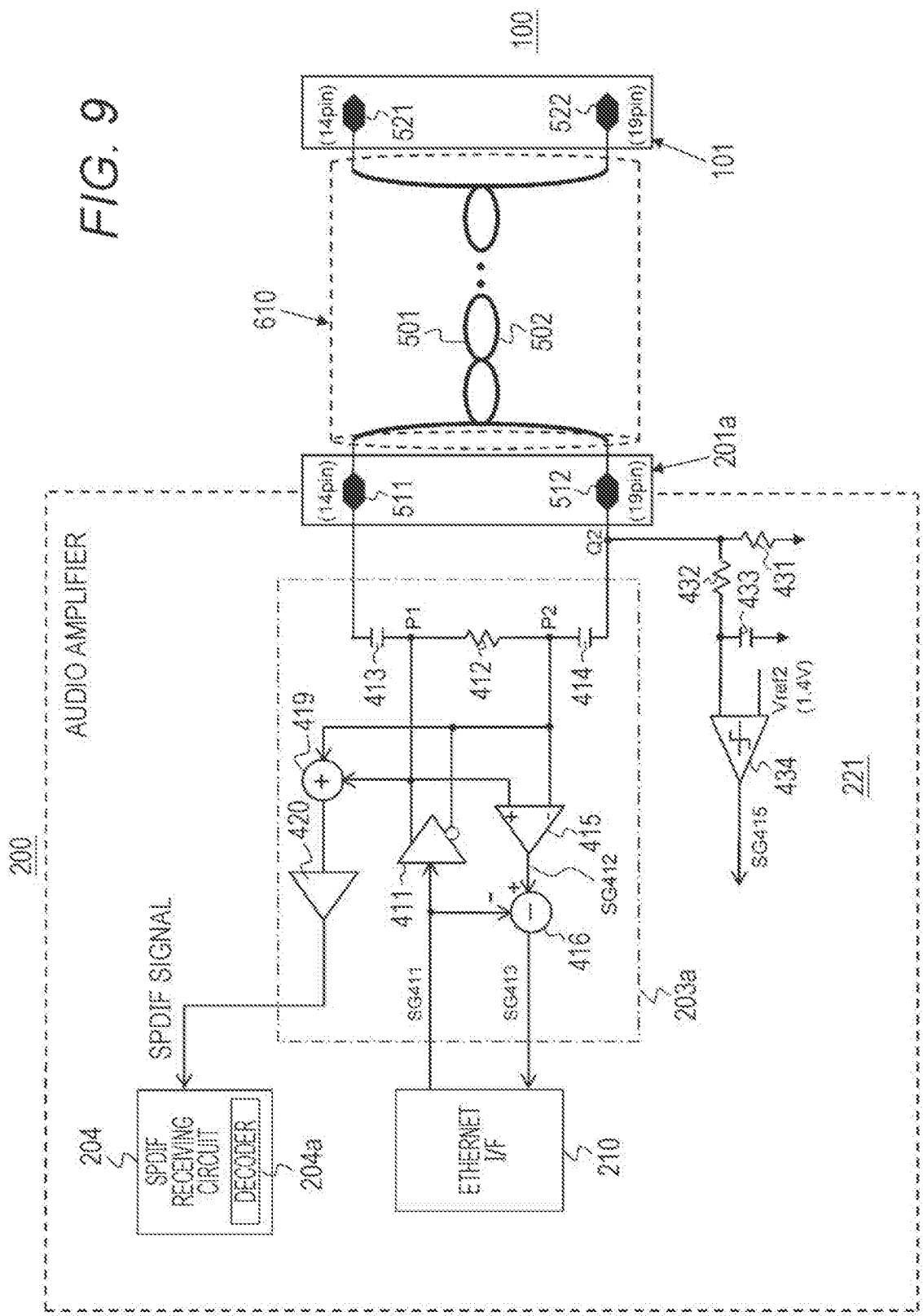
FIG. 9 is a diagram of a configuration example of a high-speed bus interface of the audio amplifier.

FIG. 9 illustrates a configuration example of the high-speed bus interface 203a of the audio amplifier 200 in the AV system 10 of FIG. 1. The Ethernet interface 210 is configured to perform local area network (LAN) communication, i.e., transmission/reception of the Ethernet signal, by means of the transfer channel including the pair of the reserve line and the HPD line of the multiple lines forming the HDMI cable 610. The SPDIF receiving circuit 204 is configured to receive the SPDIF signal by means of the transfer channel including the pair of lines as described above.

The audio amplifier 200 has a LAN signal transmission circuit 411, a terminating resistor 412, AC coupling capacitors 413 and 414, a LAN signal receiving circuit 415, a subtraction circuit 416, an addition circuit 419, and an amplifier 420. These components form the high-speed bus interface 203a. Moreover, the audio amplifier 200 has a pull-down resistor 431, a resistor 432, a capacitor 433, and a comparator 434, these components forming a plug connection detection circuit 221. The resistor 432 and the capacitor 433 described herein form a low-pass filter.

A series circuit of the AC coupling capacitor 413, the terminating resistor 412, and the AC coupling capacitor 414 is connected to between a 14 pin terminal 511 and a 19 pin terminal 512 of the HDMI terminal 201a. A connection point P1 between the AC coupling capacitor 413 and the terminating resistor 412 is connected to a positive output side of the LAN signal transmission circuit 411, and is connected to a positive input side of the LAN signal receiving circuit 415.

A connection point P2 between the AC coupling capacitor 414 and the terminating resistor 412 is connected to a negative output side of the LAN signal transmission circuit 411, and is connected to a negative input side of the LAN signal receiving circuit 415. A transmission signal (transmission data) SG411 is supplied from the Ethernet interface 210 to an input side of the LAN signal transmission circuit 411.

An output signal SG412 of the LAN signal receiving circuit 415 is supplied to a positive terminal of the subtraction circuit 416, and the transmission signal (transmission data) SG411 is supplied to a negative terminal of the subtraction circuit 416. In the subtraction circuit 416, the transmission signal SG411 is subtracted from the output signal SG412 of the LAN signal receiving circuit 415, and a reception signal SG413 is obtained. The reception signal SG413 is a LAN signal (an Ethernet signal) in a case where the LAN signal is transmitted as a differential signal via the reserve line and the HPD line. The reception signal SG413 is supplied to the Ethernet interface 210.

A connection point Q2 between the AC coupling capacitor 414 and the 19 pin terminal 512 is connected to the grounding line via the pull-down resistor 431, and is connected to the grounding line via a series circuit of the resistor 432 and the capacitor 433. Moreover, an output signal of the low-pass filter obtained at a connection point between the resistor 432 and the capacitor 433 is supplied to one input terminal of the comparator 434. In the comparator 434, the output signal of the low-pass filter is compared with a reference voltage Vref2 (+1.4V) supplied to the other input terminal. An output signal SG415 of the comparator 434 is supplied to a not-shown controller (the CPU) of the audio amplifier 200.

Moreover, the connection point P1 between the AC coupling capacitor 413 and the terminating resistor 412 is connected to one input terminal of the addition circuit 419. Further, the connection point P2 between the AC coupling capacitor 414 and the terminating resistor 412 is connected to the other input terminal of the addition circuit 419. An output signal of the addition circuit 419 is supplied to the SPDIF receiving circuit 115 via the amplifier 420. The output signal of the addition circuit 419 is the SPDIF signal in a case where the SPDIF signal is transmitted as an in-phase signal via the reserve line and the HPD line. Note that although not described in detail, the high-speed bus interface 203b of the audio amplifier 200 is similar to a configuration in which a portion relating to the SPDIF signal is excluded from the high-speed bus interface 103 illustrated in FIG. 8. Moreover, although not described in detail, the high-speed bus interface 303 of the BD player 300 is similar to a configuration in which a portion relating to the SPDIF signal is excluded from the high-speed bus interface 203a illustrated in FIG. 9.

"Details of SPDIF Signal"

Figure 10:
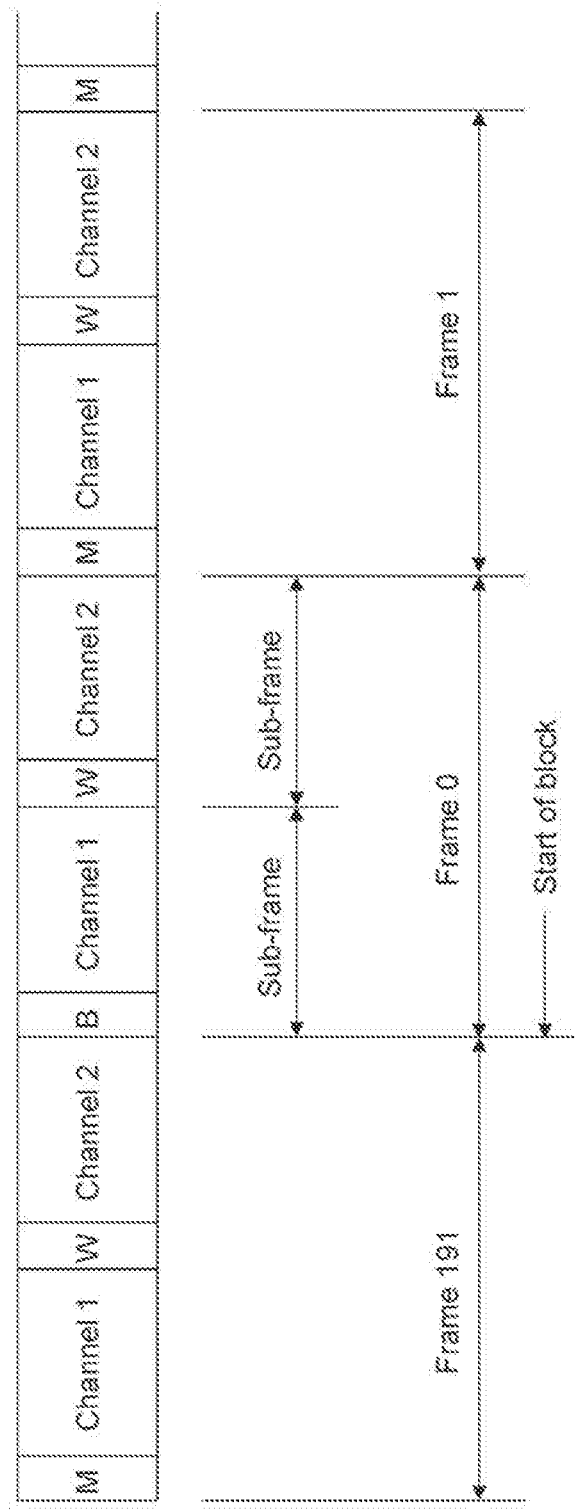
FIG. 10 is a diagram of a frame configuration according to IEC 60958 standards.

First, an outline of the IEC 60958 standards will be described. FIG. 10 illustrates a frame configuration according to the IEC 60958 standards. Each frame includes two subframes. In the case of 2-channel stereo audio, a left channel signal is contained in the first subframe, and a right channel signal is contained in the second subframe.

As described later, a preamble is provided at the beginning of the subframe such that "M" is provided as a preamble to the left channel signal and "W" is provided as a preamble to the right channel signal. Note that "B" indicating the start of a block is provided to the leading preamble for every 192 frames. That is, a single block includes 192 frames. The block is a unit forming a later-described channel status.

Figure 11:
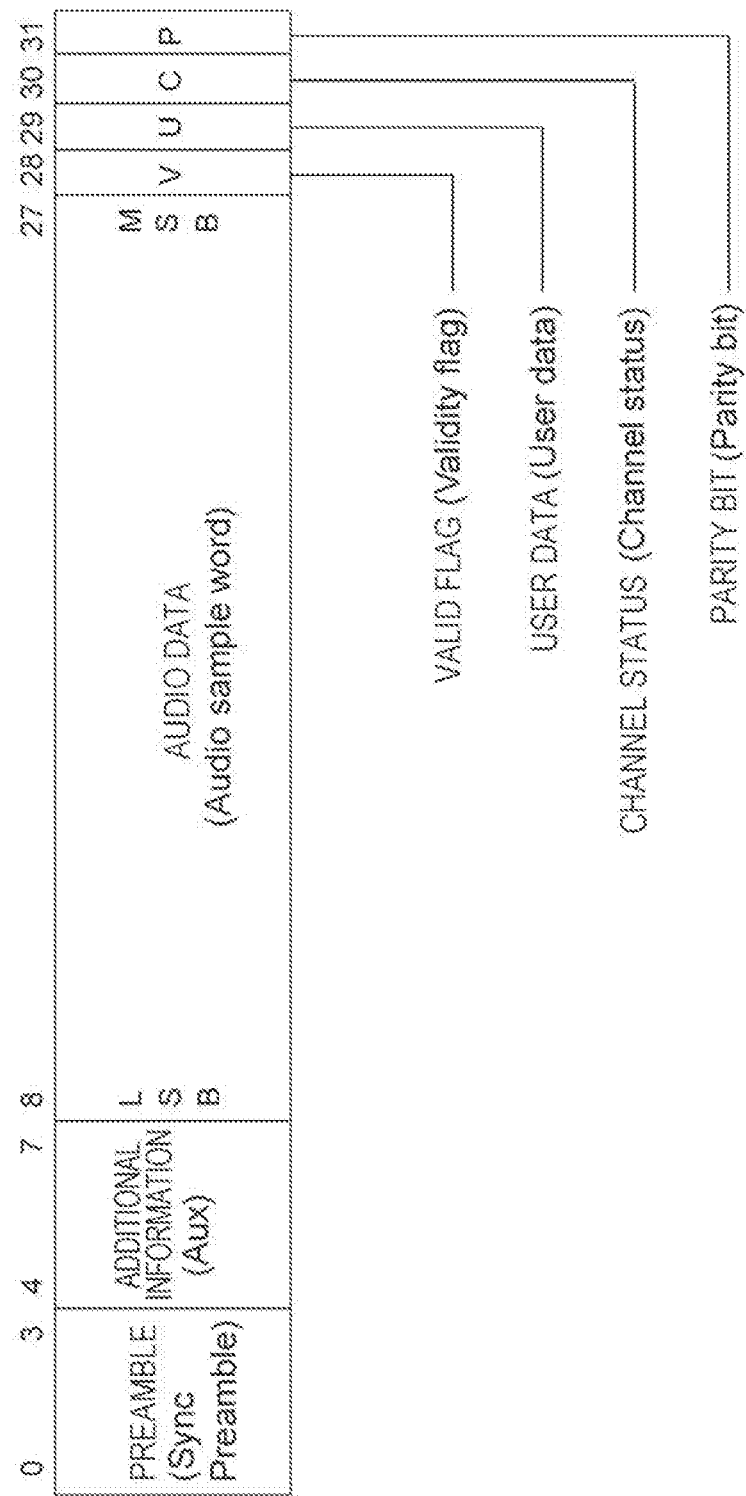
FIG. 11 is a diagram of a subframe configuration according to the IEC 60958 standards.

FIG. 11 illustrates a subframe configuration according to the IEC 60958 standards. The subframe includes the total of 32 time slots including 0th to 31st time slots. The 0th to 3rd time slots indicate the preamble (Sync preamble). This preamble is any of "M", "W", or "B" for differentiating the right and left channels and indicating the start position of the block as described above.

The 4th to 27th time slots form a main data field, and entirely indicate audio data in the case of employing a 24-bit code range. Moreover, in the case of employing a 20-bit code range, the 8th to 27th time slots indicate the audio data (Audio sample word). In the latter case, the 4th to 7th time slots can be utilized as additional information (Auxiliary sample bits).

The 28th time slot is a valid flag (Validity flag) of the main data field. The 29th time slot indicates a single bit of user data (User data). The 29th time slot is accumulated over the frames, and in this manner, a series of user data can be formed. A message of the user data is formed in units of a 8-bit information unit (IU: Information Unit), and a single message includes 3 to 129 information units.

"0" of 0 to 8 bits may be present between the information units. The beginning of the information unit is identified by a start bit of "1". The first seven information units in the message are reserved, and for the eighth and subsequent information units, the user can set optional information. The messages are divided by "0" of 8 bits or more.

The 30th time slot indicates a single bit of the channel status (Channel status). The 30th time slot is accumulated over the frames for each block, and in this manner, a series of channel status can be formed. Note that the leading position of the block is indicated by the preamble of "B" (the 0th to 3rd time slots) as described above.

The 31st time slot is a parity bit (Parity bit). This parity bit is provided such that the numbers of "0" and "1" in the 4th to 31st time slots are even numbers.

Figure 12:
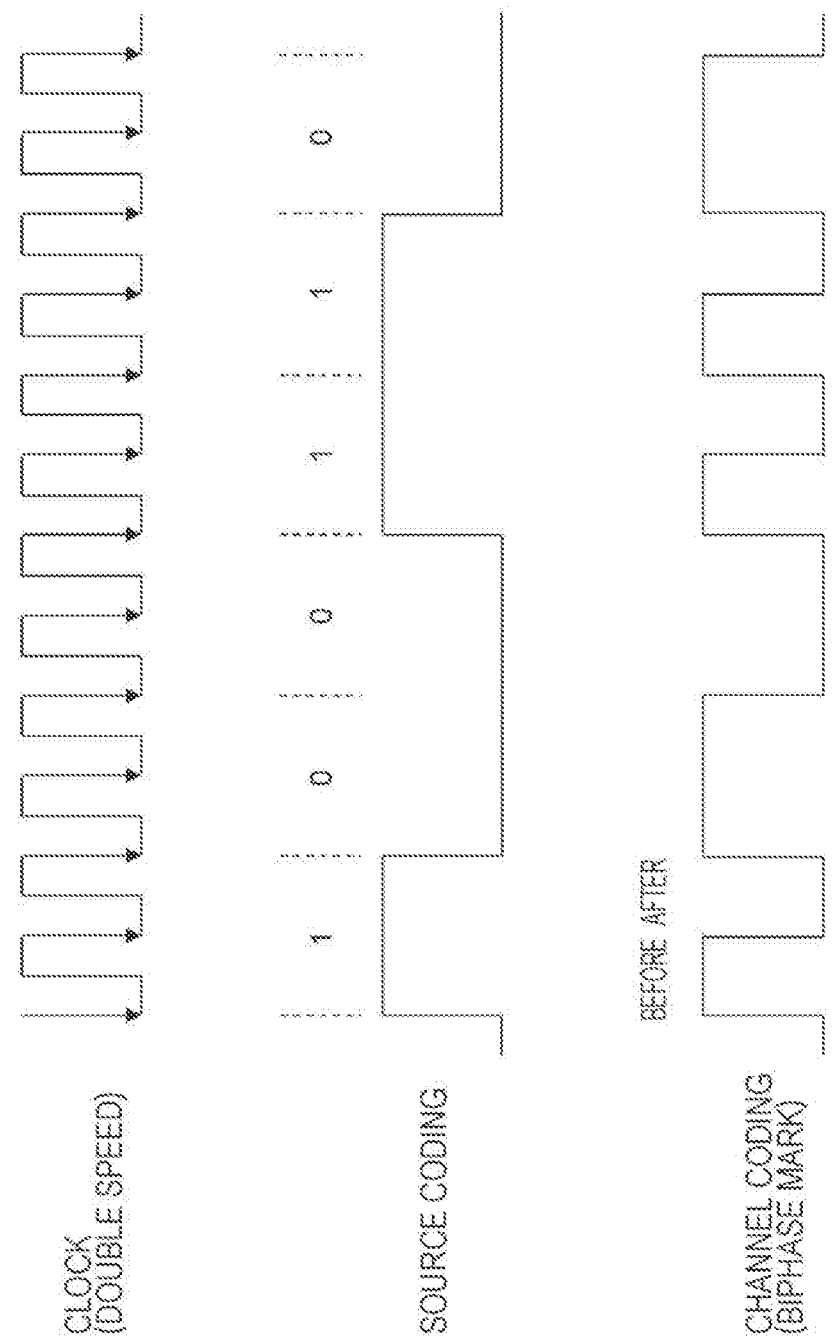
FIG. 12 is a chart of a signal modulation method according to the IEC 60958 standards.

FIG. 12 illustrates a signal modulation method according to the IEC 60958 standards. Of the subframe, the 4th to 31st time slots other than the preamble are subjected to biphase mark modulation. In biphase mark modulation, a double-speed clock of an original signal (source coding) is used. If a clock cycle of the original signal is divided into the first half and the second half, biphase mark modulation output is inevitably inverted at an edge of the first half of the clock cycle. Moreover, at an edge of the second half of the clock cycle, the output is inverted when the original signal indicates "1", and is not inverted when the original signal indicates "0". In this manner, a clock component of the original signal can be extracted from the signal subjected to biphase mark modulation.

FIG. 13 illustrates channel coding for the preamble according to the IEC 60958 standards. As described above, the 4th to 31st time slot of the subframe are subjected to biphase mark modulation. Meanwhile, the preamble of the 0th to 3rd time slots is not taken as a bit pattern subjected to normal biphase mark modulation, but as a bit pattern synchronized with the double-speed clock. That is, two bits are assigned to each time slot of the 0th to 3rd time slots, and in this manner, a 8-bit pattern is obtained as illustrated in this figure.

When a most-recent state is "0", "11101000" is assigned to the preamble "B", "11100010" is assigned to "M", and "1100100" is assigned to "W". On the other hand, when the most-recent state is "1", "00010111" is assigned to the preamble "B", "00011101" is assigned to "M", and "00011011" is assigned to "W".

Normally, the channel status is constant according to a track or contents, and does not change as long as a track or contents being transferred do not change. The same value of the channel status is repeated for each block. Only one even-number parity bit is present for transfer error detection in the subframe (see FIG. 11), and an error detection capacity is not so high.

In this embodiment, a counter value and a parity value associated with the counter value are, for each block (=192 frames), added to the audio data on a SPDIF transmission circuit 104 side. Specifically, a predetermined bit region such as a 8-bit region is newly provided in the channel status according to the IEC 60958 standards, and the counter value and the parity value are arranged in such a region. In this case, the region includes a region where the 7-bit counter value is arranged and a region where the 1-bit parity value is arranged.

FIG. 14 illustrates a channel status format according to the IEC 60958 standards. As described above, the channel status is obtained by accumulation of the 30th time slot of the subframe for each block. In this figure, the contents of the channel status are arranged for one byte at a time in a longitudinal direction, and a bit configuration for each byte is illustrated in a lateral direction. Note that description will be made herein assuming a commercial-off-the-shelf (Consumer use) format.

In a 0th bit (bit 0), a="0" indicates that the channel status is for consumer use. Moreover, b="0" in a 1st bit (bit 1) indicates use in linear PCM transfer. 6th and 7th bits (bit 6-7) are fields indicating a channel status mode. Note that each of other currently-used bit regions will not be described.

A 8-bit regions from 64th to 71st bits is a region newly provided for arranging the counter value and the parity value. In this case, the 7-bit counter value of "B6-B0" is arranged in the 65th to 71st bits. Moreover, the 1-bit parity value of "P7" is arranged in the 64th bit on a leading side of this 7-bit region. Note that the 8-bit region from the 64th to 71st bits is described as the region newly provided for arranging the counter value and the parity value, but the newly-provided region is not limited to such a region. Other currently-unused regions may be provided as the newly-provided region.

On the SPDIF transmission circuit 104 side, the counter value and the parity value change according to an audio data state. Thus, on a reception side, an audio data error can be detected on the basis of the counter value and the parity value. In this embodiment, the counter value and the parity value change according to an audio data encryption state.

For example, while a reset state in which no encryption is performed for the audio data is continued, the counter value "B6-B0" is maintained at 0 (a decimal number), and the parity value "P7" is a preset parity value of an even-number parity or an odd-number parity. In this embodiment, description will be made below, assuming that the parity value is set in advance to the even-number parity.

Moreover, while a state in which encryption is performed for the audio data is continued, the counter value "B6-B0" is incremented for each block, and the parity value "P7" is the value of the even-number parity. Further, while a pause state in which no encryption is performed for the audio data is continued, the counter value "B6-B0" is fixed to a predetermined value, and the parity value "P7" is an inverted value of the even-number parity value.

As described above, the counter value and the parity value change according to the audio data encryption state. Thus, on the SPDIF receiving circuit 204 side, an error (the reset state or the pause state) in encryption of the audio data can be detected, and therefore, the decoding processing can be canceled.

Note that an example where the counter value and the parity value are changed and information regarding the audio data encryption state is sent to the SPDIF receiving circuit 204 side has been described above. However, other types of information may be, without limitation to above, sent to the SPDIF receiving circuit 204 side with the counter value and the parity value being in predetermined states based on a preset rule.

For example, information indicating that the audio of the audio data needs to be muted by means of the counter value and the parity value can be sent. The counter value and the parity value corresponding to the above-described reset or pause state may be, as the information indicating that the audio of the audio data needs be to muted, set in advance between the SPDIF transmission circuit 104 and the SPDIF receiving circuit 204.

Figures 15, 16:
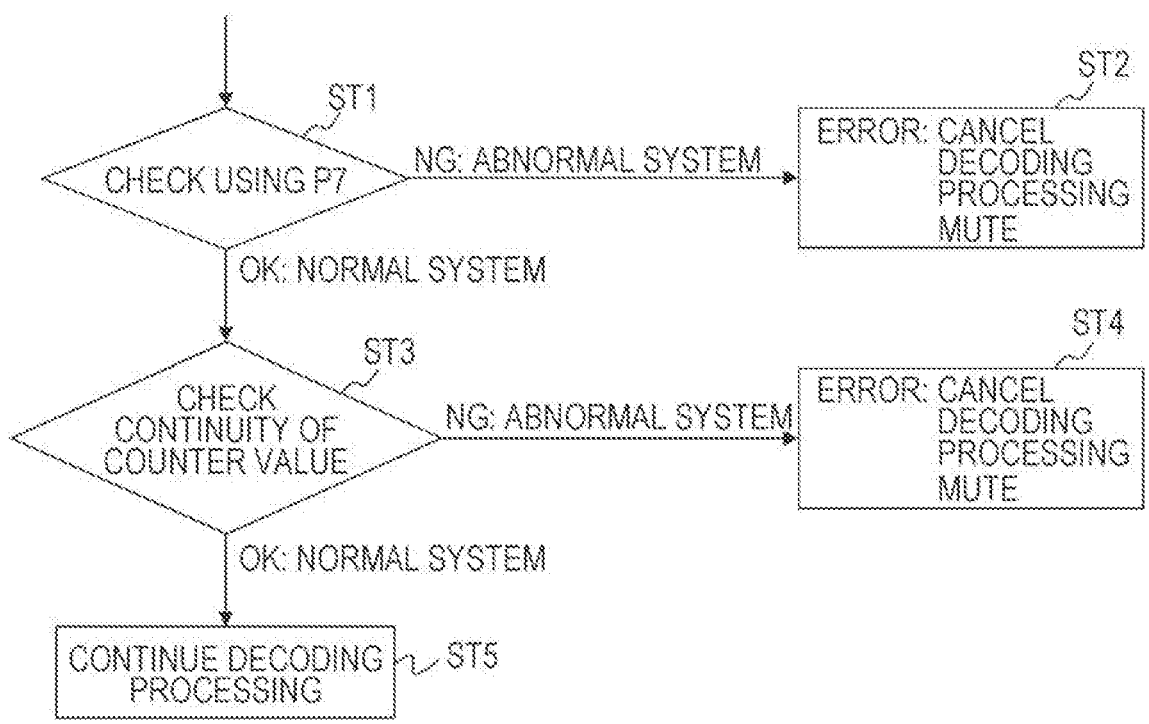
FIG. 15 is a table of one example of a relationship between a change in a counter value and a parity value and an audio data encryption state.
FIG. 16 is a flowchart of one example of processing based on the counter value and the parity value for each block in a SPDIF receiving circuit.

FIG. 15 illustrates one example of a relationship between a change in the counter value and the parity value and the audio data encryption state. When the counter value "B6-B0" is 0 (the decimal number) and the parity value "P7" is "0", the reset state is indicated, and no encryption of the audio data is performed. In a case where the counter value "B6-B0" is 0 (the decimal number) as described above, the reset state in which processing relating to encryption is not performed on neither a transmission side nor the reception side is brought. In this case, the parity value "P7" is "0", and backward compatibility with a legacy device performing no processing relating to encryption can be ensured.

From this reset state, when the counter value "B6-B0" changes to 1 (a decimal number) and the parity value "P7" changes to "1", such a state indicates the start of encryption, and the audio data is brought into an encrypted state. Note that an actual state change starts from a subsequent block. The same applies to other state changes. While the counter value "B6-B0" is incremented and the parity value "P7" is the even-number parity value accordingly, such a state indicates continuation of encryption of the audio data. In this state, the parity value "P7" changes in a regular manner according to increment of the counter value "B6-B0".

From this state, when the parity value "P7" turns into the inverted value of the even-number parity value without incrementing the counter value "B6-B0", such a state indicates the start of the pause state. In the illustrated example, such a state is a state when the counter value "B6-B0" is 5

(a decimal number) and the parity value "P7" is "1". In this pause state, no encryption of the audio data is performed. While such a state is continued, the state indicates continuation of the pause state.

From this pause state, when the counter value "B6-B0" is incremented and the parity value "P7" changes to a corresponding even-number parity value, encryption is resumed, and the audio data is brought into a re-encrypted state. Then, while the counter value "B6-B0" is incremented and the parity value "P7" is a corresponding even-number parity value, such a state indicates continuation of encryption of the audio data.

A flowchart of FIG. 16 illustrates one example of processing based on the counter value and the parity value for each block in the SPDIF receiving circuit 204. At step ST1, it is checked whether or not the parity value "P7" is coincident with a predicted value in the case of incrementing and changing the counter value "B6-B0". The IEC 60958 standards are serial transfer, and therefore, checking using the parity value "P7" is allowed before all counter values "B6-B0" are acquired. In the case of "NG", it is taken as abnormal. At step ST2, the audio data is taken as an error, and the decoding processing is canceled. Further, audio muting is performed.

In the case of "OK" at step ST1, continuity of the counter value "B6-B0" is checked at step ST3. In the case of "NG", it is taken as abnormal. At step ST4, the audio data is taken as an error, and the decoding processing is canceled. Further, audio muting is performed. On the other hand, in the case of "OK", the decoding processing is continued at step ST5.

Note that the counter value is transmitted from the SPDIF transmission circuit 104 to the SPDIF receiving circuit 204, and therefore, the SPDIF transmission circuit 104 to the SPDIF receiving circuit 204 can easily synchronously perform a change in keys for an encryption circuit and a decoding circuit on the basis of the counter value.

Moreover, an example where the counter value "B6-B0" is sequentially counted up has been described above, but an example where the counter value randomly changes is also conceivable. In this case, a count-up value is encrypted and randomized on the SPDIF transmission circuit 104 side. On the reception side, a random counter value "B6-B0" is decoded in use.

A pattern in a change in the counter value "B6-B0" is shared in advance between the SPDIF transmission circuit 104 and the SPDIF receiving circuit 204, and therefore, in the SPDIF receiving circuit 204, transfer different from normal transfer can be recognized and the processing can be changed. For example, in normal transfer, copy of contents is impossible. On the other hand, in the case of transfer using the randomized counter value "B6-B0", a change in the processing, such as permission for first-generation copy, can be made.

Figures 17, 18:
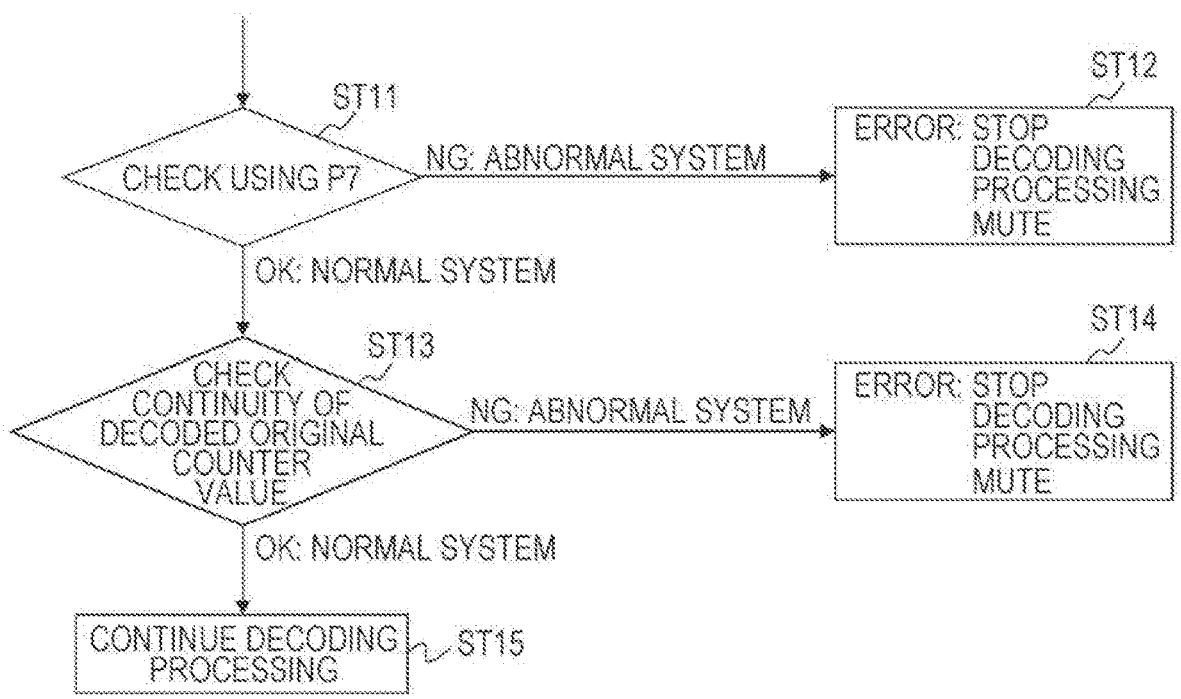
FIG. 17 is a table of one example of a relationship among a change in the counter value and the parity value, an original counter value, and the audio data encryption state.
FIG. 18 is a flowchart of one example of the processing based on the counter value and the parity value for each block in the SPDIF receiving circuit.

FIG. 17 illustrates one example of a relationship among a change in the counter value and the parity value, an original counter value, and the audio data encryption state. When the counter value "B6-B0" is 0 (the decimal number) and the parity value "P7" is "0", such a state indicates the reset state, and no encryption of the audio data is performed. As described above, in a case where the counter value "B6-B0" is 0 (the decimal number), the transmission side and the reception side are in the reset state in which the processing relating to encryption is not performed. In this case, the parity value "P7" is "0", and backward compatibility with the legacy device performing no processing relating to encryption can be ensured.

From this reset state, when the counter value "B6-B0" is 31 (a decimal number) and the parity value "P7" changes to "1", such a state indicates the start of encryption, and the audio data is brought into the encrypted state. Note that an actual state change starts from a subsequent block. A counter value "B6-B0" of 31 is obtained by encryption of an original counter value of 1.

While the counter value "B6-B0" changes, for example, in the order of 31, 3, 77, 4, and 101 and the parity value "P7" is a corresponding even-number parity value, such a state indicates continuation of encryption of the audio data. In this state, the parity value "P7" changes in a regular manner according to a change in the counter value "B6-B0". Counter values "B6-B0" of 31, 3, 77, 4, and 101 are each obtained by encryption of original counter values of 1, 2, 3, 4, and 5.

From this state, when the parity value "P7" turns into the inverted value of the even-number parity value without changing the counter value "B6-B0", such a state indicates the start of the pause state. In the illustrated example, such a state is a state when the counter value "B6-B0" is 101 (a decimal number) and the parity value "P7" is "1". In this pause state, no encryption of the audio data is performed. While such a state is continued, the state indicates continuation of the pause state.

From this pause state, when the counter value "B6-B0" changes and the parity value "P7" changes to a corresponding even-number parity value, such a state indicates resuming of encryption, and the audio data is brought into the re-encrypted state. The illustrated example shows that the counter value "B6-B0" is 9 (a decimal number) and the parity value "P7" is "0". A counter value "B6-B0" of 9 is obtained by encryption of an original counter value of 6. Then, while the counter value "B6-B0" changes, for example, in the order of 9 and 46 and the parity value "P7" is a corresponding even-number parity value, such a state indicates continuation of encryption of the audio data. Counter values "B6-B0" of 9 and 46 are each obtained by encryption of original counter values of 6 and 7.

A flowchart of FIG. 18 illustrates one example of the processing based on the counter value and the parity value for each block in the SPDIF receiving circuit 204. At step ST11, it is checked whether or not the parity value "P7" is coincident with a predicted value in the case of changing the counter value "B6-B0". The IEC 60958 standards are serial transfer, and therefore, checking using the parity value "P7" is allowed before all counter values "B6-B0" are acquired. In the case of "NG", it is taken as abnormal. At step ST12, the audio data is taken as an error, and the decoding processing is canceled. Further, audio muting is performed.

In the case of "OK" at step ST11, continuity of the original counter value obtained by decoding of the counter value "B6-B0" is checked at step ST13. In the case of "NG", it is taken as abnormal. At step ST14, the audio data is taken as an error, and the decoding processing is canceled. Further, audio muting is performed. On the other hand, in the case of "OK", the decoding processing is continued at step ST15.

Note that continuation of encryption is indicated by increment of the counter value "B6-B0" or the original counter value thereof, but a decrement case may be used to give a meaning different from that in the case of increment. For example, preparation for particular processing such as the decoding processing can be made in good time on the reception side in such a manner that the counter value "B6-B0" is counted up in a subsequent block after the counter value "B6-B0" has been counted down to 0 (the decimal number). In this case, the counter value "B6-B0" may code two's complement.

Moreover, although not described above, a meaning may be given to arrangement of one or more numerical values indicated by one or more counter values "B6-B0", and may be transmitted as predetermined command information from the SPDIF transmission circuit 104 to the SPDIF receiving circuit 204.

Figure 19:
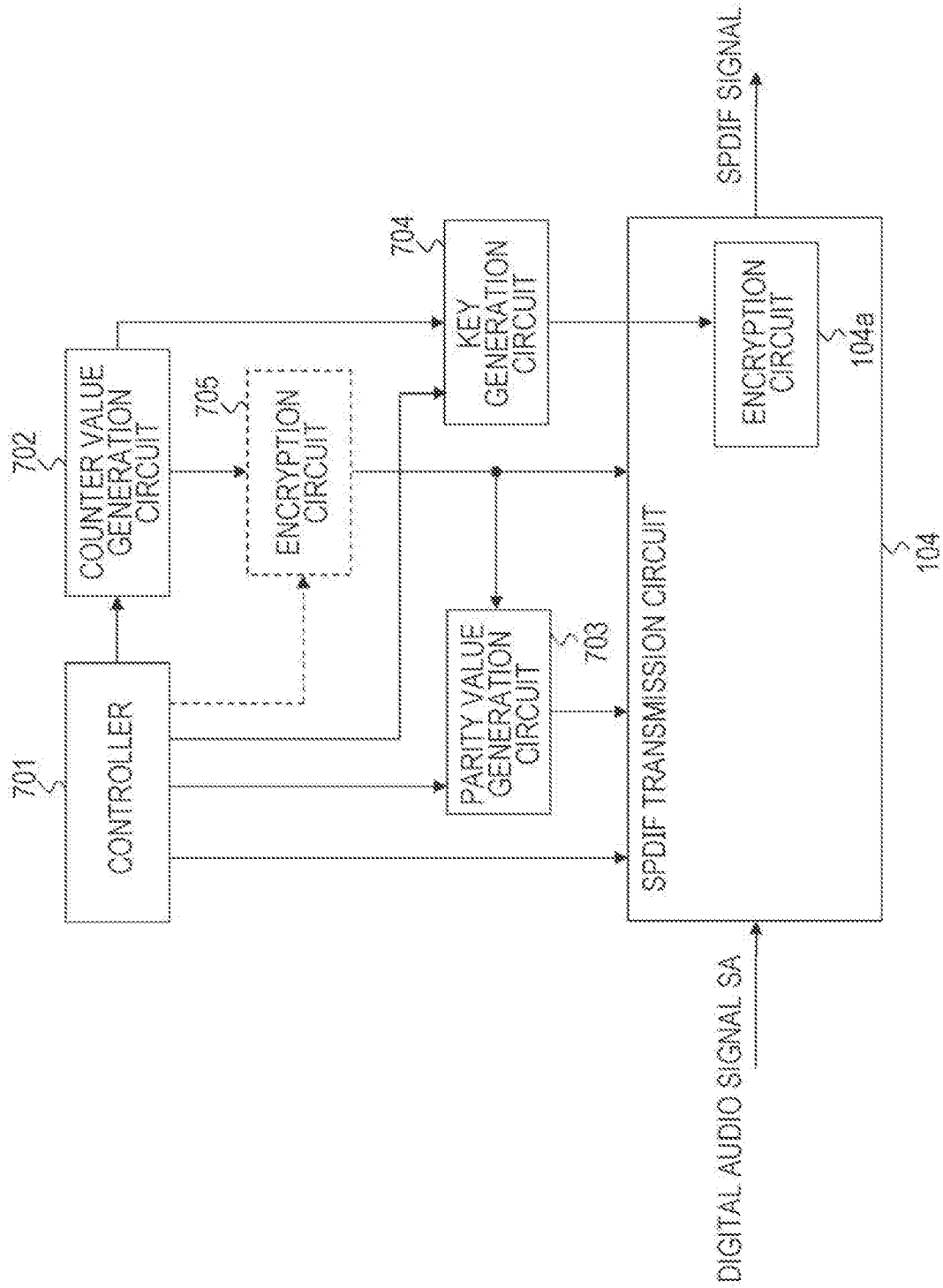
FIG. 19 is a block diagram of one example of configurations of a SPDIF transmission circuit etc. in the television receiver.

FIG. 19 illustrates one example of configurations of the SPDIF transmission circuit 104 etc. in the television receiver 100 (see FIGS. 1 and 2). For example, a controller 701 includes a CPU, and is configured to control operation of each circuit. The digital audio signal SA is input to the SPDIF transmission circuit 104. The SPDIF transmission circuit 104 processes the digital audio signal SA, thereby outputting the SPDIF signal. In the SPDIF transmission circuit 104, the audio data is encrypted by the encryption circuit 104a.

A counter value generation circuit 702 is configured to generate the counter value (the original counter value) for each block under control of the controller 701. The counter value is, as the counter value "B6-B0", directly provided to the SPDIF transmission circuit 104 or provided to the SPDIF transmission circuit 104 after the counter value has been encrypted by an encryption circuit 705. Moreover, the counter value "B6-B0" is sent to a parity value generation circuit 703. The parity value generation circuit 703 is configured to generate the parity value "P7" for each block under control of the controller 701. The parity value "P7" is provided to the SPDIF transmission circuit 104.

The counter value "B6-B0" and the parity value "P7" provided to the SPDIF transmission circuit 104 change according to the audio data state such as the encryption state (see FIGS. 15 and 17). In the SPDIF transmission circuit 104, the counter value "B6-B0" and the parity value "P7" are arranged in the 8-bit region of the channel status (see FIG. 14).

Moreover, the counter value (the original counter value) generated by the counter value generation circuit 702 is supplied to a key generation circuit 704. The key generation circuit 704 is configured to change a key to be generated according to the counter value. The key generated by the key generation circuit 704 is used in the encryption circuit 104a of the SPDIF transmission circuit 104.

Figure 20:
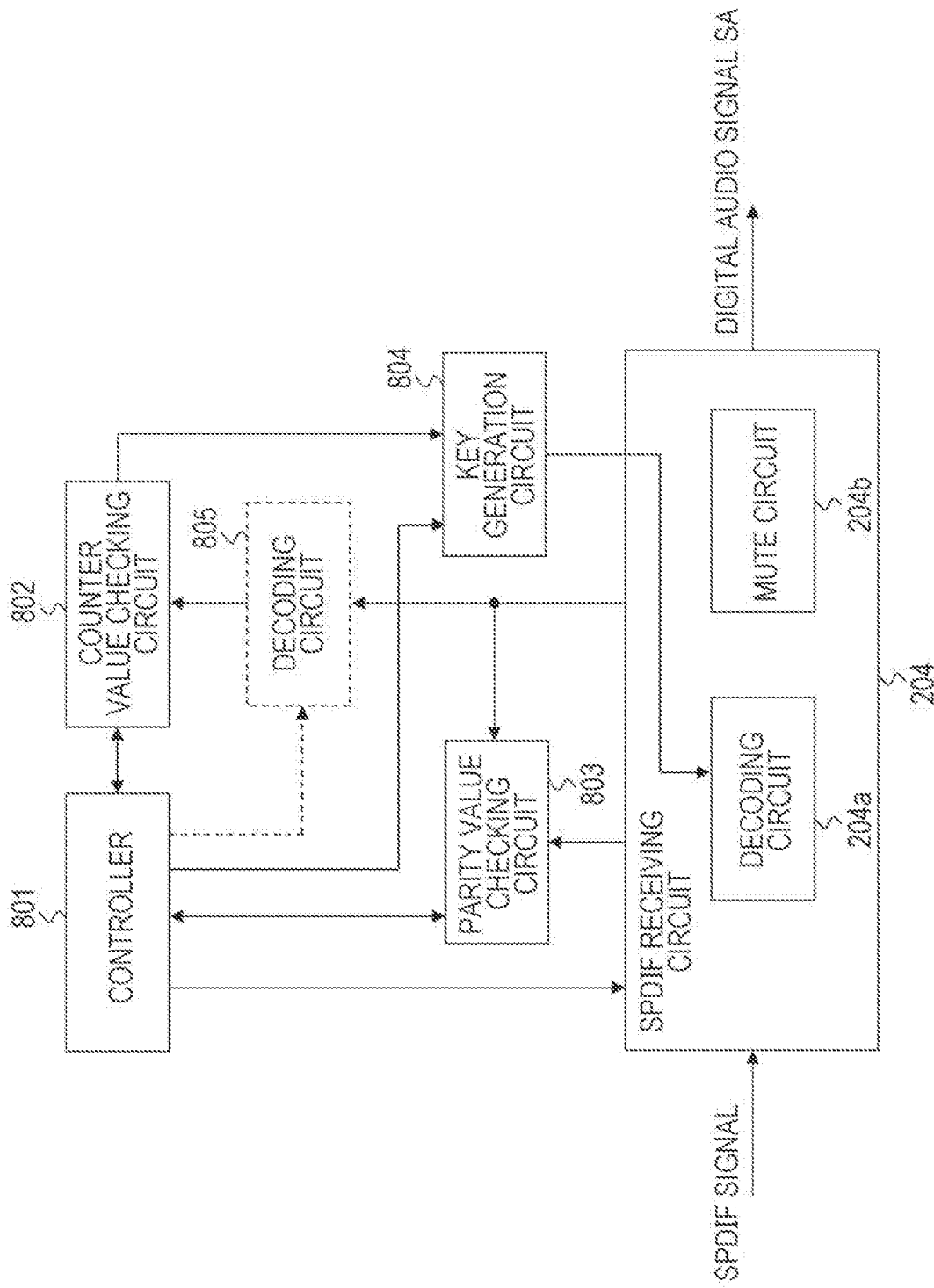
FIG. 20 is a block diagram of one example of configurations of the SPDIF receiving circuit etc. in the audio amplifier.

FIG. 20 illustrates one example of configurations of the SPDIF receiving circuit 204 etc. in the audio amplifier 200 (see FIGS. 1 and 3). For example, a controller 801 includes a CPU, and is configured to control operation of each circuit. The SPDIF signal is input to the SPDIF receiving circuit 204. The SPDIF receiving circuit 204 processes the SPDIF signal, thereby outputting the digital audio signal SA. In the SPDIF receiving circuit 204, the audio data is decoded by the decoding circuit 204a. Moreover, in the SPDIF receiving circuit 204, audio muting processing is performed as necessary by a mute circuit 204b.

The counter value "B6-B0" and the parity value "P7" arranged in the 8-bit region of the channel status are extracted for each block from the SPDIF receiving circuit 204. The counter value "B6-B0" is directly provided to a counter value checking circuit 802 or is provided to the counter value checking circuit 802 after the counter value "B6-B0" has been decoded by a decoding circuit 805. The counter value checked by the counter value checking circuit 802 is provided to the controller 801.

Moreover, the counter value "B6-B0" and the parity value "P7" extracted from the SPDIF receiving circuit 204 are provided to a parity value checking circuit 803. A checking result on whether or not the parity value is correct in the counter value checking circuit 802 is provided to the controller 801. The controller 801 is configured to detect the audio data error such as an encryption error on the basis of the checking results for the counter value and the parity value. For example, the reset state or the pause state is detected as the audio data encryption error.

The controller 801 controls the decoding circuit 204a or the mute circuit 204b of the SPDIF receiving circuit 204 according to an audio data error detection state such as an encryption error detection state. For example, in the reset state or the pause state, the transmitted audio data is not encrypted. Thus, the decoding processing in the decoding circuit 204a is canceled, and the audio muting processing is performed in the mute circuit 204b.

Moreover, the counter value (the original counter value) checked in the counter value checking circuit 802 is supplied to a key generation circuit 804. The key generation circuit 804 is configured to change a key to be generated according to the counter value. The key generated by the key generation circuit 804 is used in the decoding circuit 204a of the SPDIF receiving circuit 204. In this case, in the decoding circuit 204a, the key is changed in synchronization with a key change in the encryption processing on the transmission side, and therefore, the decoding processing is properly performed.

As described above, in the AV system 10 illustrated in FIG. 1, the counter value and the parity value associated with the counter value are, for each block of 192 frames, added to the audio data contained in the SPDIF signal transmitted from the television receiver 100 to the audio amplifier 200. Thus, on the reception side, the audio data error in association with the processing on the transmission side can be detected on the basis of the counter value and the parity value. The processing can be easily performed for the audio data in synchronization with the processing on the transmission side.

Moreover, the counter value and the parity value added to each block change according to the encryption state. Thus, on the reception side, the audio data encryption state can be properly determined on the basis of the counter value and the parity value, and the decoding processing for the audio data can be properly performed.

<2. Variations>

Note that in the above-described embodiment, an example where the counter value and the parity value associated with the counter value are, for each block of 192 frames, added to the audio data has been described. However, a configuration in which only the counter value is added is also conceivable. In this case, predetermined information is sent to the reception side in such a manner that the counter value is brought into a predetermined state based on a preset rule. On the reception side, audio data processing or other types of processing are controlled on the basis of the counter value and therefore predetermined information.

Moreover, in the above-described embodiment, the audio data processing such as the muting processing and the code decoding processing has been described as special processing performed on the reception side on the basis of the counter value and the parity value and therefore the predetermined information. However, the present technology is not limited to above. Further, the special processing is not necessarily the processing relating to the audio data, and may be processing for simultaneously-transmitted video data or processing in an external device such as a speaker connected to the reception side, for example.

Further, in the above-described embodiment, an example where HDMI ARC is utilized for transferring the SPDIF signal from the television receiver 100 to the audio amplifier 200 has been described. That is, an example where the HDMI ARC is utilized as an IEC 60958 transfer channel has been described. The present technology is similarly applicable to an example where a coaxial cable or an optical cable is utilized as the IEC 60958 transfer channel.

In addition, the technology may have the following configurations.

(1) A Transmission Apparatus Including a data transmitter configured to sequentially transmit each audio data unit of audio data to a reception side via a predetermined transfer channel, and an information adder configured to add, for every predetermined number of audio data units, a counter value and a parity value associated with the counter value to the audio data transmitted by the data transmitter, in which predetermined information is transmitted to the reception side with the counter value and the parity value being in a predetermined state based on a preset rule.

(2) The transmission apparatus according to (1), in which the predetermined information is information indicating that audio of the audio data needs to be muted.

(3) The transmission apparatus according to (1), further including an encrypter configured to encrypt the audio data transmitted by the data transmitter, in which the predetermined information is information indicating the state of encryption of the audio data.

(4) The transmission apparatus according to (3), in which while a reset state in which no encryption is performed for the audio data is continued, the counter value is maintained at "0", and the parity value is a preset parity value of an even-number parity or an odd-number parity.

(5) The transmission apparatus according to (3) or (49), in which while a state in which encryption is performed for the audio data is continued, the counter value is incremented for every predetermined number of audio data units, and the parity value is the preset parity value of the even-number parity or the odd-number parity.

(6) The transmission apparatus according to (3) or (4), in which while the state in which encryption is performed for the audio data is continued, the counter value is incremented for every predetermined number of audio data units and is further encrypted, and the parity value is the preset parity value of the even-number parity or the odd-number parity.

(7) The transmission apparatus according to any one of (3) to (6), in which while a pause state in which no encryption is performed for the audio data is continued, the counter value is fixed to a predetermined value, and the parity value is an inverted value of the preset parity value of the even-number parity or the odd-number parity.

(8) The transmission apparatus according to any one of (1) to (7), in which the information adder uses a predetermined bit region of a channel status of each block formed for every predetermined number of audio data units to add the counter value and the parity value.

(9) The transmission apparatus according to (8), in which the predetermined bit region is a 8-bit region, the 8-bit region including a region where a 7-bit counter value is arranged and a region where a 1-bit parity value added to a leading side of the region is arranged.

(10) A transmission method including a data transmission step of sequentially transmitting, by a data transmitter, each audio data unit of audio data to a reception side via a predetermined transfer channel, and an information adding step of adding, by an information adder, a counter value and a parity value associated with the counter value to the audio data transmitted by the data transmitter for every predetermined number of audio data units, in which predetermined information is transmitted to the reception side with the counter value and the parity value being in a predetermined state based on a preset rule.

(11) A receiving apparatus including a data receiver configured to sequentially receive each audio data unit of audio data from a transmission side via a predetermined transfer channel, in which a counter value and a parity value associated with the counter value are, for every predetermined number of audio data units, added to the audio data, the counter value and the parity value are in a predetermined state based on a preset rule, and indicate predetermined information, and a controller configured to control processing for the audio data on the basis of the counter value and the parity value is further provided.

(12) The receiving apparatus according to (11), in which the predetermined information is information indicating that audio of the audio data needs to be muted, and the controller controls the processing of muting the audio of the audio data.

(13) The receiving apparatus according to (11), in which the predetermined information is information indicating the state of encryption of the audio data, and the controller controls decoding processing for the audio data.

(14) The receiving apparatus according to any one of (11) to (13), in which a predetermined bit region of a channel status of each block formed for every predetermined number of audio data units is used to add the counter value and the parity value to the audio data.

(15) The receiving apparatus according to (14), in which the predetermined bit region is a 8-bit region, the 8-bit region including a region where a 7-bit counter value is arranged and a region where a 1-bit parity value added to a leading side of the region is arranged.

(16) A receiving method including a data receiving step of sequentially receiving, by a data receiver, each audio data unit of audio data from a transmission side via a predetermined transfer channel, in which a counter value and a parity value associated with the counter value are, for every predetermined number of audio data units, added to the audio data, the counter value and the parity value are in a predetermined state based on a preset rule, and indicate predetermined information, and a control step of controlling, by a controller, processing for the audio data on the basis of the counter value and the parity value is further provided.

(17) A transmission apparatus including a data transmitter configured to sequentially transmit each audio data unit of audio data to a reception side via a predetermined transfer channel, and an information adder configured to add, for every predetermined number of audio data units, a counter value to the audio data transmitted by the data transmitter, in which predetermined information is transmitted to the reception side with the counter value being in a predetermined state based on a preset rule.

(18) A receiving apparatus including a data receiver configured to sequentially receive each audio data unit of audio data from a transmission side via a predetermined transfer channel, in which a counter value is, for every predetermined number of audio data units, added to the audio data, the counter value is in a predetermined state based on a preset rule, and indicates predetermined information, and a controller configured to control processing for the audio data on the basis of the counter value is further provided.

REFERENCE SIGNS LIST

10 AV system
100 Television receiver
101 HDMI terminal
102 HDMI receiver
103 High-speed bus interface
104 SPDIF transmission circuit
104a Encrypter
105 Antenna terminal
106 Digital tuner
107 MPEG decoder
108 Video signal processing circuit
109 Graphic generation circuit
110 Panel drive circuit
111 Display panel
112 Audio signal processing circuit
113 Audio amplification circuit
114 Speaker
115 Ethernet interface
116 Network terminal
120 Internal bus
121 CPU
122 Flash ROM
123 DRAM
124 Display controller
125 Remote controller receiver
126 Remote controller transmitter
127 Power source
128 Plug connection transmission circuit
200 Audio amplifier
201a, 201b HDMI terminal
202a HDMI transmitter
202b HDMI receiver
203a, 203b High-speed bus interface
204 SPDIF receiving circuit
204a Decoder
204b Mute circuit
205 MPEG decoder
206 Video/graphic processing circuit
207 Audio processing circuit
208 Audio amplification circuit
209 Audio output terminal
210 Ethernet interface
211 Internal bus
212 CPU
213 Flash ROM
214 DRAM
215 Display controller
216 Panel drive circuit
217 Display panel
218 Power source
219 Remote controller receiver
220 Remote controller transmitter
221 Plug connection detection circuit
300 BD player
301 HDMI terminal
302 HDMI transmitter
303 High-speed bus interface
304 Internal bus
305 CPU
306 Flash ROM
307 SDRAM
308 Display controller
309 Remote controller receiver
310 Remote controller transmitter
311 Storage medium control interface
312a BD drive
312b HDD
312c SSD
313 Ethernet interface
314 Network terminal
315 MPEG decoder
316 Graphic generation circuit
317 Video output terminal
318 Audio output terminal
319 Panel drive circuit
320 Display panel
321 Power source
400 Receiving antenna
500 Speaker system
610, 620 HDMI cable
630 Optical cable
701 Controller
702 Counter value generation circuit
703 Parity value generation circuit
704 Key generation circuit
705 Encryption circuit
801 Controller
802 Counter value checking circuit
803 Parity value checking circuit
804 Key generation circuit
805 Decoding circuit

The invention claimed is:

1. A transmission apparatus, comprising:
a data transmitter configured to sequentially transmit each audio data unit of audio data to a reception side via a determined transfer channel;
an information adder configured to add, for every determined number of audio data units, a counter value and a parity value associated with the counter value to the audio data transmitted by the data transmitter, wherein a state of the counter value and the parity value based on a preset rule indicates determined information to the reception side; and
an encrypter configured to encrypt the audio data transmitted by the data transmitter, wherein the determined information indicates a state of encryption of the audio data.

2. The transmission apparatus according to claim 1, wherein the determined information further indicates that audio of the audio data needs to be muted.

3. The transmission apparatus according to claim 1, further comprising a counter value generation circuit and a parity value generation circuit, wherein while a reset state in which no encryption is performed for the audio data is continued, the counter value generation circuit is configured to maintain the counter value at "0", and the parity value generation circuit is configured to set the parity value to a preset parity value of one of an even-number parity or an odd-number parity.

4. The transmission apparatus according to claim 1, further comprising a counter value generation circuit and a parity value generation circuit, wherein while a state in which the encryption is performed for the audio data is continued, the counter value generation circuit is configured to increment the counter value for every determined number of audio data units, and the parity value generation circuit is configured to set the parity value to a preset parity value of one of an even-number parity or an odd-number parity.

5. The transmission apparatus according to claim 1, further comprising a counter value generation circuit and a parity value generation circuit, wherein while a state in which the encryption is performed for the audio data is continued, the counter value generation circuit is configured to increment and encrypt the counter value for every determined number of audio data units, and the parity value generation circuit is configured to set the parity value to a preset parity value of one of an even-number parity or an odd-number parity.

6. The transmission apparatus according to claim 1, further comprising a counter value generation circuit and a parity value generation circuit, wherein while a pause state in which no encryption is performed for the audio data is continued, the counter value generation circuit is configured to fix the counter value to a determined value, and the parity value generation circuit is configured to set the parity value to an inverted value of a preset parity value of one of an even-number parity or an odd-number parity.

7. The transmission apparatus according to claim 1, wherein the information adder is further configured to use a determined bit region of a channel status of each block formed for every determined number of audio data units to add the counter value and the parity value.

8. The transmission apparatus according to claim 7, wherein
the determined bit region is an 8-bit region,
the 8-bit region includes a first region that includes a 7-bit counter value and a second region that includes a 1-bit parity value added to a leading side of the first region.

9. A transmission method, comprising:
adding, by an information adder, a counter value and a parity value associated with the counter value to audio data to be transmitted for every determined number of audio data units, wherein a state of the counter value and the parity value based on a preset rule indicates determined information to a reception side;
encrypting, by an encrypter, the audio data to be transmitted, wherein the determined information indicates a state of encryption of the audio data; and
sequentially transmitting, by a data transmitter, each audio data unit of the audio data to the reception side via a determined transfer channel.

10. A receiving apparatus, comprising:
a data receiver configured to sequentially receive each audio data unit of audio data from a transmission side via a determined transfer channel, wherein
the audio data includes a counter value and a parity value associated with the counter value for every determined number of audio data units,
the counter value and the parity value are in a determined state based on a preset rule,
the determined state indicates determined information, and
the determined information indicates a state of encryption of the audio data; and
a controller configured to control a decoding process for the audio data based on the counter value and the parity value.

11. The receiving apparatus according to claim 10, wherein
the determined information indicates that audio of the audio data needs to be muted, and
the controller is further configured to control a process of muting the audio of the audio data.

12. The receiving apparatus according to claim 10, wherein a determined bit region of a channel status of each block formed for every determined number of audio data units is used to add the counter value and the parity value to the audio data.

13. The receiving apparatus according to claim 12, wherein
the determined bit region is an 8-bit region, and
the 8-bit region includes a first region that includes a 7-bit counter value and a second region that includes a 1-bit parity value added to a leading side of the first region.

14. A receiving method, comprising:
sequentially receiving, by a data receiver, each audio data unit of audio data from a transmission side via a determined transfer channel, wherein
the audio data includes a counter value and a parity value associated with the counter value for every determined number of audio data units,
the counter value and the parity value are in a determined state based on a preset rule,
the determined indicates determined information, and
the determined information indicates a state of encryption of the audio data; and
controlling, by a controller, a decoding process for the audio data based on the counter value and the parity value.

15. A transmission apparatus, comprising:
a data transmitter configured to sequentially transmit each audio data unit of audio data to a reception side via a determined transfer channel;
an information adder configured to add, for every determined number of audio data units, a counter value to the audio data transmitted by the data transmitter, wherein a state of the counter value based on a preset rule indicates determined information to the reception side; and
an encrypter configured to encrypt the audio data transmitted by the data transmitter, wherein the determined information indicates a state of encryption of the audio data.

16. A receiving apparatus, comprising:
a data receiver configured to sequentially receive each audio data unit of audio data from a transmission side via a determined transfer channel, wherein
the audio data includes a counter value for every determined number of audio data units,
the counter value is in a determined state based on a preset rule, and indicates determined information, and
the determined information indicates a state of encryption of the audio data; and
a controller configured to control a decoding process for the audio data based on the counter value.

* * * * *